(12) United States Patent
Banerjee et al.

(10) Patent No.: US 7,236,465 B2
(45) Date of Patent: Jun. 26, 2007

(54) SYSTEM AND METHOD FOR GATHERING MULTICAST CONTENT RECEIVER DATA

(75) Inventors: Dwip N. Banerjee, Austin, TX (US); Rabindranath Dutta, Los Angeles, CA (US); Kumar Ravi, Cedar Park, TX (US); Krishna Kishore Yellepeddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1045 days.

(21) Appl. No.: 10/171,952

(22) Filed: Jun. 13, 2002

(65) Prior Publication Data

US 2003/0231629 A1 Dec. 18, 2003

(51) Int. Cl.
*H04J 3/24* (2006.01)
*H04J 3/26* (2006.01)

(52) U.S. Cl. ...................... 370/312; 370/432
(58) Field of Classification Search ............ 370/390, 370/312, 432; 455/518, 519, 41.2, 41.3
See application file for complete search history.

(56) References Cited

U.S. PATENT DOCUMENTS

| | | | |
|---|---|---|---|
| 5,826,010 A | 10/1998 | Joseph et al. | 395/186 |
| 6,330,671 B1* | 12/2001 | Aziz | 713/163 |
| 6,587,943 B1* | 7/2003 | Hardjono | 713/163 |
| 6,611,864 B2* | 8/2003 | Putzolu et al. | 709/223 |
| 6,880,090 B1* | 4/2005 | Shawcross | 713/153 |
| 6,963,573 B1* | 11/2005 | Cain et al. | 370/401 |
| 7,061,880 B2* | 6/2006 | Basilier | 370/312 |
| 2002/0085506 A1* | 7/2002 | Hundscheidt et al. | 370/254 |
| 2003/0165140 A1* | 9/2003 | Tang et al. | 370/393 |
| 2003/0233540 A1* | 12/2003 | Banerjee et al. | 713/153 |

FOREIGN PATENT DOCUMENTS

| | | |
|---|---|---|
| WO | WO 99/65190 | 12/1999 |
| WO | WO 00/59151 | 10/2000 |

OTHER PUBLICATIONS

Tao Zhou, "How IP Multicasting Works," Windows & .Net Magazine, May 1997 (3 pages).

* cited by examiner

*Primary Examiner*—Seema S. Rao
*Assistant Examiner*—Hong Sol Cho
(74) *Attorney, Agent, or Firm*—Van Leeuwen & Van Leeuwen; Marilyn S. Dawkins

(57) ABSTRACT

A system and method for gathering data regarding receivers of multicast content is provided. A spanning tree is used to connect a content producer, such as a pay-per-view broadcaster, to one or more receivers over a computer network, such as the Internet. Clients that wish to join a multicast group to which content is sent join the multicast group at the client's designated multicast router. The router sends information regarding the request, such as a tally of the number of clients that have joined the group, through intermediate routers to an endpoint router as identified by the spanning tree. The content producer is able to use the information, such as the tally and demographic information, to analyze the group of receivers. In a pay-per-view setting, the tally can further be compared to the number of subscribers to determine whether illicit receivers have joined the group, whereupon appropriate action is taken.

21 Claims, 19 Drawing Sheets

SYSTEM AND METHOD FOR GATHERING MULTICAST CONTENT RECEIVER DATA

BACKGROUND OF THE INVENTION

1. Technical Field

The present invention relates in general to a system and method for gathering data regarding receivers of multicast content. In particular, the present inventions relates to a system and method for transmitting multicast receiver data back to a content producer sending content to a multicast content through a computer network, such as the Internet.

2. Description of the Related Art

Many emerging Internet applications are one-to-many or many-to-many, where one or multiple sources are sending to multiple receivers. Examples are the transmission of corporate messages to employees, communication of stock quotes to brokers, video and audio conferencing for remote meetings and telecommuting, and replicating databases and web site information. IP Multicast supports this type of transmission by enabling sources to send a single copy of a message to multiple recipients who explicitly want to receive the information. This is more efficient than requiring the source to send an individual copy of a message to each requester (referred to as point-to-point unicast), in which case the number of receivers is limited by the bandwidth available to the sender. It is also more efficient than broadcasting one copy of the message to all nodes (broadcast) on the network, since many nodes may not want the message, and because broadcasts are limited to a single subnet.

Multicast is a receiver-based concept: receivers join a particular multicast session group and traffic is delivered to all members of that group by the network infrastructure. In a traditional system, the sender does not maintain a list of receivers. Only one copy of a multicast message passes over any link in the network, and copies of the message are made only where paths diverge at a router.

The membership of a group is dynamic; that is, receivers may join and leave groups at any time. There is no restriction on the location or number of members in a group. A receiver may also be a member of more than one group at a time. In addition, at the application level, a single group address may have multiple data streams on different port numbers, on different sockets, in one or more applications. Multiple applications may share a single group address on a receiver's computer system.

To support native IP Multicast, the sending and receiving nodes and network infrastructure between them are each multicast-enabled, including any intermediate routers. Requirements for native IP Multicast at the end node hosts include: (i) support for IP Multicast transmission and reception in the TCP/IP protocol stack; (ii) software supporting the Internet Group Management Protocol (IGMP) to communicate requests to join a multicast group(s) and receive multicast traffic; (iii) network interface cards and drives which efficiently filter for LAN data link layer addresses mapped from network layer IP Multicast addresses; (iv) IP Multicast application software, such as for video conferencing; and (v) IP Multicast enabled intermediate routers between the sender(s) and receiver(s). Many new routers have support for IP Multicast. Older ones may require more memory before they can be upgraded.

IP Multicast has broad and growing industry backing, and is supported by many vendors of network infrastructure elements such as routers, switches, TCP/IP stacks, network interface cards, desktop operating systems and application software.

FIG. 1a shows a prior art depiction of content producer 100 sending content to several clients using multicast enabled routers. Content producer 100 sends the content to sender's subnet 102 where the content is received by two clients (clients 103 and 106) connected to the sender's subnet. These clients previously joined the multicast group to which the content was sent. Two other clients (108 and 110) are also connected to the sender's subnet but do not receive the content because they did not join the group to which the content was sent.

Sender's subnet 102 includes multicast enabled router 112 which forwards the content to multicast enabled router 114 which is interconnected to multicast enabled internetwork 116. The content travels through multicast enabled internetwork 116 on its way to other clients who joined the group but are not connected to the sender's subnet, such as clients connected to receiver's subnet 122.

The content arrives at multicast enabled router 118 which forwards the content to multicast enabled router 120 that is included in receiver's subnet 122. The content is transmitted by multicast enabled router 120 to clients within receiver's subnet 122. Two of the clients (124 and 126) included in receiver's subnet 122 previously joined the group to which the content was sent and therefore receive the content. Two other clients (128 and 130) are included in the receiver's subnet but do not receive the content because they did not join the group to which the content was sent.

IP Multicast can be optimized in a LAN by using multicast filtering switches. An IP Multicast-aware switch provides the same benefits as a multicast router, but in the local area. Without one, the multicast traffic is sent to all segments on the local subnet. An IP Multicast aware switch can automatically set up multicast filters so the multicast traffic is only directed to the participating end nodes.

FIG. 1b shows a prior art depiction of multicast enabled filtering switches. Network 150, such as the Internet, transmits multicast content that is received by multicast enabled router 160. Multicast enabled router 160 transmits the content to multicast filtering switch 170. Multicast filtering switch 170 determines which downstream switches have previously joined the multicast group to which the content is being sent. In the example shown, downstream multicast filtering switch 180 is connected to two devices that have joined the group (receiver 182 and receiver 186) and one device that has not joined the group (non-receiver 184). Because there is at least one device that joined the group, MC filtering switch 170 transmits the content onto MC filtering switch 180 for further transmission to the devices. On the other hand, MC filtering switch 190 has no receiving devices (only non-receiving devices 192, 194, and 196), therefore the content is not forwarded from MC filtering switch 170 to MC filtering switch 190.

IP Multicast uses Class D Internet Protocol addresses—those with 1110 as their high-order four bits—to specify multicast groups. In Internet standard "dotted decimal" notation, group addresses range from 224.0.0.0 to 239.255.255.255. Two types of group addresses are supported: permanent and temporary. Examples of permanent addresses, as assigned by the Internet Assigned Numbers Authority (IANA), are 224.0.0.1, the "all-hosts group" used to address all IP Multicast receivers on the directly connected network, and 224.0.0.2, which addresses all routers on a LAN. The range of addresses between 224.0.0.0 and 224.0.0.255 is reserved for routing protocols and other low-level topology discovery or maintenance protocols. Other addresses and ranges have been reserved for applications, such as 224.0.13.000 to 224.0.13.255 for Net News.

To send an IP Multicast data stream, the sender specifies an appropriate destination address, which represents a group. IP Multicast data streams are sent using the same "Send IP" operation used for unicast data streams. Compared to sending of IP Multicast data streams, reception of IP Multicast data streams is more complex, particularly over a WAN.

To receive data streams, a user's application requests membership in the multicast group associated with a particular multicast (e.g. "I want to view today's baseball game"). This membership request is communicated to the LAN router and, if necessary, on to intermediate routers between the sender and the receiver. As another consequence of its group membership request, the receiving computer's network interface starts filtering for the LAN-specific hardware (data-link layer) address associated with the new multicast group address.

Wide Area Network (WAN) routers deliver the requested incoming multicast data streams to the LAN router, which maps the group address to its associated hardware address and builds the message (for example, an Ethernet frame) using this address. The receiving computer's network interface card and network driver, listening for these addresses, pass the multicast messages to the TCP/IP protocol stack, which makes them available as input to the user's application, such as a video viewer.

Whereas an IP unicast address is statically bound to a single local network interface on a single IP network, an IP group address is dynamically bound to a set of local network interfaces on a set of IP networks. An IP group address is not bound to a set of IP unicast addresses. Multicast routers do not know the list of receivers for each group—only the groups for which there is one member on the subnetwork. A multicast router attached to an Ethernet need associate only a single Ethernet multicast address with each group having a local member.

Each IP Multicast packet uses the time-to-live (TTL) field of the IP header as a scope-limiting parameter. The TTL field controls the number of hops that an IP Multicast packet is allowed to propagate. Each time a router forwards a packet, its TTL is decremented. A multicast packet whose TTL has expired (is 0) is dropped, without an error notification to the sender. This mechanism prevents messages from needless transmission to regions of the worldwide Internet that lie beyond the subnets containing the multicast group members.

A local network multicast reaches all immediately-neighboring members of the destination group (the IP TTL is 1 by default). If a multicast data stream has a TTL greater than 1, the multicast router(s) attached to the local network take responsibility for internetwork forwarding (see FIG. 1a for an example). The data stream is forwarded to other networks that have members of the destination group. On those other member networks that are reachable within the IP time-to-live, an attached multicast router completes delivery by transmitting the data stream as a local multicast. TTL thresholds in multicast routers prevent data streams with less than a certain TTL from traversing certain subnets. This can provide a mechanism for confining multicast traffic to within campus or enterprise networks.

Multicast packets from remote sources are relayed by routers, which forwards them on to the local network if there is a recipient for the multicast group on the LAN. The Internet Group Management Protocol (IGMP) is used by multicast routers to identify the existence of group members on their directly attached subnets. These routers do so by sending IGMP queries and having receivers report their group memberships.

IGMP messages are encapsulated in IP data streams. IGMP has two kinds of packets: Membership Query and Membership Report. To determine if any computers on a local subnet belong to a multicast group, one multicast router per subnet periodically sends a hardware (data link layer) multicast IGMP Membership Query to all IP end nodes on its LAN, asking them to report back on the group memberships of their processes. This query is sent to the all-hosts group (network address 224.0.0.1) and a TTL of 1 is used so that these queries are not propagated outside of the LAN. Each computing device sends back one IGMP Membership Report message per group, sent to the group address, so all group members see it (thus only one member reports membership). When a process asks its computing device to join a new multicast group, the driver creates a hardware multicast address, and an IGMP Membership Report with the group address is sent. The device's network interface maps the IP host group addresses to local network addresses as required to update its multicast reception filter. Each device keeps track of its group memberships, and when the last process on a device leaves a group, that group is no longer reported by the device. Periodically the local multicast router sends an IGMP Membership Query to the "all-hosts" group, to verify current memberships. If all member hosts reported memberships at the same time frequent traffic congestion might result. This is avoided by having each device delay its report by a random interval if it has not seen a report for the same group from another device. As a result, only one membership report is sent in response for each active group address, although many hosts may have memberships. One challenge that arises as a result is that devices, such as routers, do not know the number of receivers for a group.

IGMP updates are used by multicast routing protocols to communicate host group memberships to neighboring routers, propagating group information through the internetwork. IGMP is used to identify a designated router in the LAN for this purpose.

The Internet includes a multitude of subnetworks connected by routers. When the source of a message is located on one subnet and the destination is located on a different subnet, the IP protocol determines how to get from the source to the destination. Each device on the Internet has an address that identifies its physical location; part of the address identifies the subnet on which it resides and part identifies the particular device on that subnet. Routers periodically send routing update messages to adjacent routers, conveying the state of the network as perceived by that particular router. This data is recorded in routing tables that are then used to determine optimal transmission paths for forwarding messages across the network.

Unicast transmission involves transmission from a single source to a single destination. Thus, the transmission is directed towards a single physical location that is specified by the host address. The routing procedure, as described above, is relatively straightforward because of the binding of a single address to a single host.

FIG. 2 is a prior art depiction of a routing map that may be used for unicast transmissions. In the example shown, there are several possible paths to transmit the unicast transmission from one router to another. Router 200 can send a transmission to router 290 and it can pass through a number of different routers. Router 200 is connected to two routers, 210 and 220. Router 210, in turn, is connected to two other routers, 230 and 225, while router 220 is also connected to router 225 as well as router 240. Router 225 is connected to four different routers—210, 220, 250, and 260.

Router 250 and 260 are also shown being connected to four routers, router 250 connected to routers 225, 230, 260, and 280, while router 260 is connected to routers 225, 240, 250, and 290. Needless to say, there are multiple ways a unicast transmission can be sent to any given router.

Routing multicast traffic adds complexity. A multicast address identifies a particular transmission session, rather than a specific physical destination. An individual host is able to join an ongoing multicast session, by using IGMP to communicate this desire to its subnet router. One approach to sending data to multiple receivers would be for the source to maintain a table identifying all the receiving subnets participating in the session and to send a separate copy of the data to each receiving subnet. However, this would be an inefficient use of bandwidth, since many of the data streams would follow the same path throughout much of the network. Techniques have been developed to address the problem of efficiently routing multicast traffic. Since the number of receivers for a multicast session can potentially be quite large, the source should not need to know all the relevant addresses. Instead, the network routers are able to translate multicast addresses into host addresses. The basic principle involved in multicast routing is that routers interact with each other to exchange information about neighboring routers. To avoid duplication of effort, a single router is selected (via IGMP) as the Designated Router for each physical network.

For efficient transmission, Designated Routers construct a "spanning tree" that connects all members of an IP Multicast group. A spanning tree has enough connectivity so that there is only one path between every pair of routers, and it is loop-free. If each router knows which of its lines belong to the spanning tree, it can copy an incoming multicast data stream onto all of its outgoing branches, generating only the minimum needed number of copies. Messages are replicated only when the tree branches, thus minimizing the number of copies of the messages that are transmitted through the network. Since multicast groups are dynamic, with members joining or leaving a group at any time, the spanning tree is dynamically updated. Branches in which no listeners exist are discarded (pruned). A router selects a spanning tree based on the network layer source address of a multicast packet, and prunes that spanning tree based on the network layer destination address.

FIG. 3 is a prior art depiction of a spanning tree created from the router configuration shown in FIG. 2. As can be seen, there is now only one path a transmission can take to reach any given router. Starting at router 300, transmissions destined for subnets covered by routers 310, 330, or 370 take the left most branch from router 300. Transmissions destined for other subnets covered by routers 320, 325, 350, 380, 340, 360, or 390 take the right most branch from router 300. Router 320 is used to branch messages between its left branch which covers routers 325, 350, and 380, and its right branch which covers routers 340, 360, and 390. Multicast transmissions use the spanning tree shown in FIG. 3 to ensure that any given subnet only receives one copy of the transmission, thus conserving network bandwidth.

While traditional multicast networks provide many opportunities, they also present certain challenges with delivering content to receivers. The content producer is unable to determine the number of receivers that have joined groups to receive content. This is a particular challenge for pay-per-view content distributions where the producer is supposed to be paid by receivers and would like to reduce or eliminate the number of devices that receive the content without paying for it. What is needed, therefore, is a system and method that provides the content producer with information regarding multicast receivers. These statistics can then be used by the producer in a number of ways, including reducing or eliminating the number of non-paying receivers for pay-per-view content.

SUMMARY

It has been discovered that data regarding multicast receivers can be gathered by multicast routers and transmitted back to an endpoint multicast router. A content producer that uses a multicast group to disseminate content can retrieve the data gathered by the multicast routers to determine, among other things, the number of network devices that have joined the multicast group. This data can be used by the content producer in a variety of ways, such as determining whether unauthorized, or illicit, receivers have joined the group, as well as analyzing the popularity of content being disseminated.

The content producer advertises content that the producer plans to disseminate to a multicast group at a particular time. The advertisement may be through an Internet web site, also called the content server, used by the content producer. In addition to providing information about the content, the producer also provides users with a multicast group identifier that identifies the multicast group to which the content will be sent. The content could include a wide variety of programming such as a live performance by a popular musical group, a live sports broadcast, a political speech or address, a movie, or other type of content. In addition, the content producer may intend to disseminate the content only to paid subscribers or may intend to disseminate the content for free to anyone that wishes to receive it.

An Internet user, or "client," visits the content producer's web server using web browsing software (e.g., Netscape Navigator™, Microsoft Internet Explorer™). The user peruses the content producer's web site for content offerings. When the user locates content that he or she wishes to receive, the user selects the content. The selection can be performed using a pointing device (e.g., a mouse) to select a hyperlink on the content producer's web site. In response to the user selecting a content offering, the web server returns a multicast group address, or identifier, corresponding to the multicast group to which the content will be transmitted over the computer network. The client, in turn, uses the multicast group identifier to "join" the particular multicast group at the designated multicast router within the user's subnet (the client's "edge router").

A spanning tree is built between the client's edge router and the designated multicast router within the content producer's subnet (the "endpoint router"). Data regarding the client is propagated from the client's edge router through intermediate routers (if necessary) to the endpoint router. Data regarding the client can be simple tally information so that the content producer can determine the number of network devices that have joined the multicast group in order to receive the content. Tally information can be used to determine the popularity of a multicast content dissemination. The popularity of the content can be used to, among other things, set advertising rates for advertisements played in conjunction with the dissemination. Data regarding the client can also include demographic information that the client provides, such as the client's age, income bracket, etc. This data can further be used to provide the content producer with valuable information about the audience of the content.

In a pay-per-view or other type of subscriber setting, the tally and other information regarding the multicast content receivers informs the content producer of whether illicit receivers have joined the multicast group without paying to receive the content. In these situations, the content producer can inform the paid subscribers of a new multicast group address that the subscribers join. The content producer then sends content to the new multicast group address which is received by the subscribers. Illicit receivers, on the other hand, would not be informed of the new multicast group address and, therefore, would be unable to continue receiving the content.

In one embodiment, the new multicast group address is sent to the subscribers over a secure channel, such as a Secure Socket Layers (SSL) channel, that is established between the content producer and subscribers. In this manner, the secure channel is used to transmit relatively little data (i.e., the new multicast group address) in order to provide a level of security for multicast content disseminated over an otherwise unsecured channel. In another embodiment, a channel algorithm is securely transmitted from the content producer to the subscribers. The channel algorithm determines when the multicast group address is changed as well as the new multicast identifier for the new multicast group. Again, since the channel algorithm is only sent to subscribers, illicit receivers would be unable to determine either the time when the multicast group address is set to change nor the address of the new multicast group. Illicit receivers, therefore, are unable to join the new multicast group and, therefore, are unable to continue receiving content.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1A:
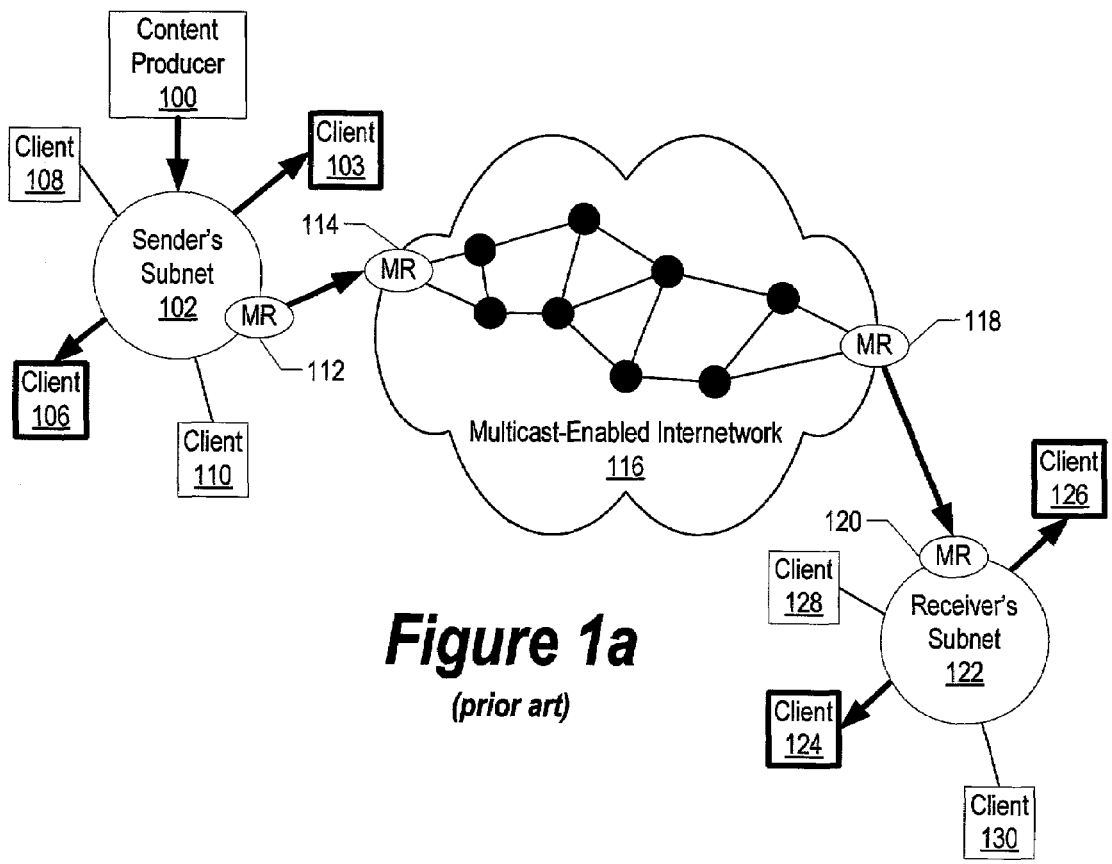
FIG. 1a shows a prior art depiction of a content producer sending content to several clients using multicast enabled routers.
Figure 1B:
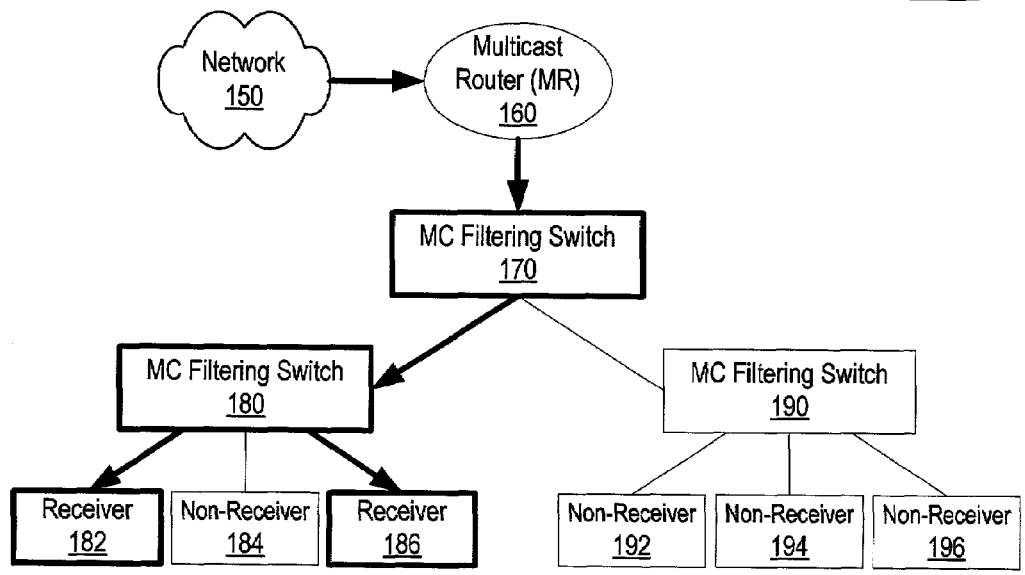
FIG. 1b shows a prior art depiction of multicast enabled filtering switches.
Figure 2:
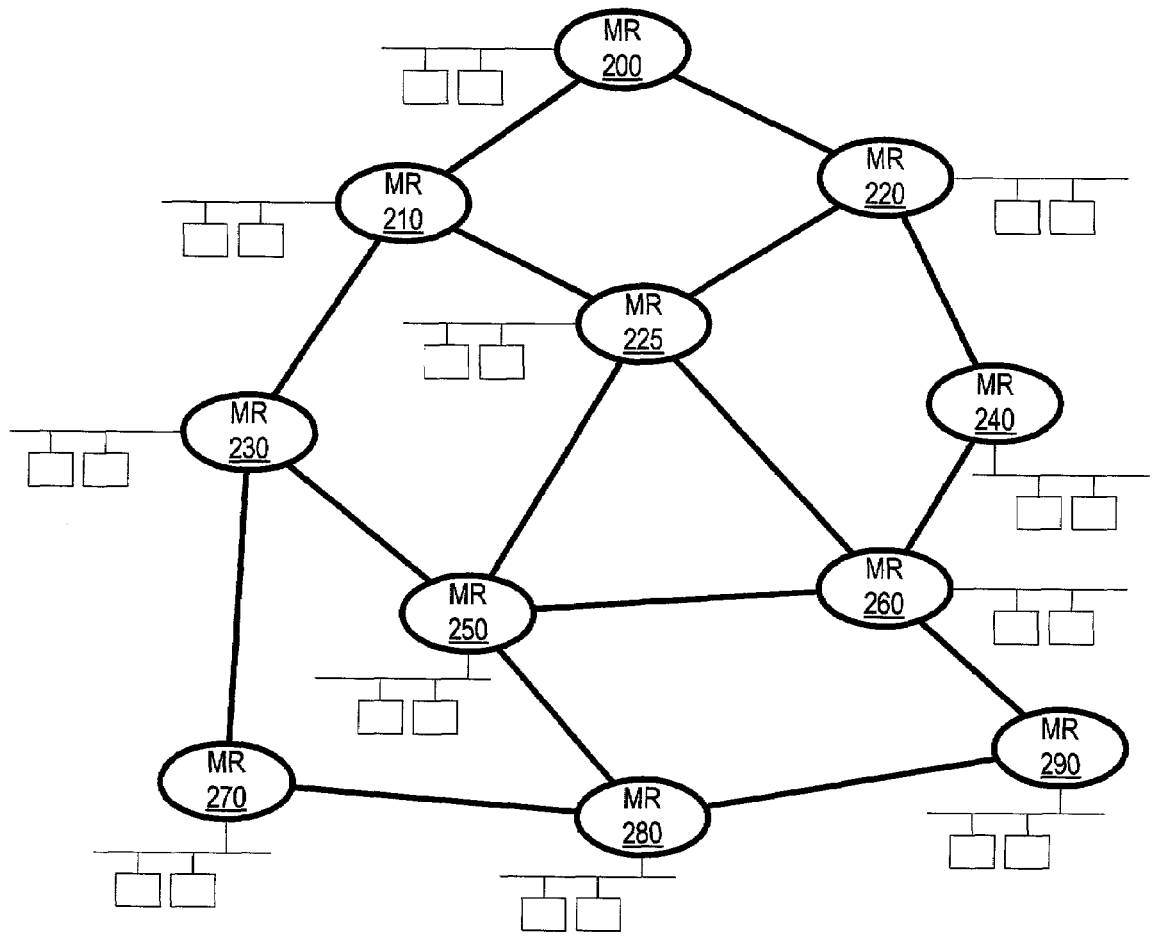
FIG. 2 is a prior art depiction of a routing map that may be used for unicast transmissions.
Figure 3:
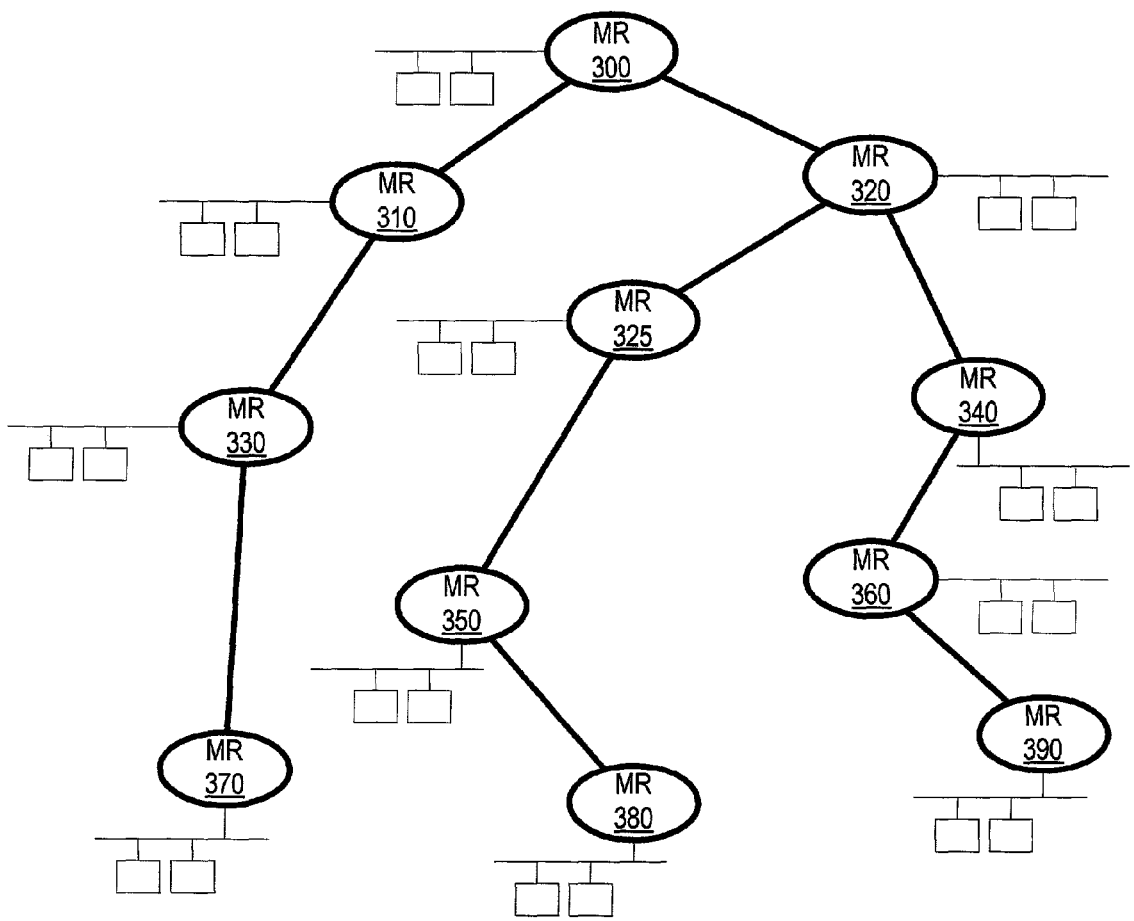
FIG. 3 is a prior art depiction of a spanning tree created from the router configuration shown in FIG. 2.

FIGS. 1–3 are prior art depictions that where previously described in the Description of the Related Art.

Figure 4:
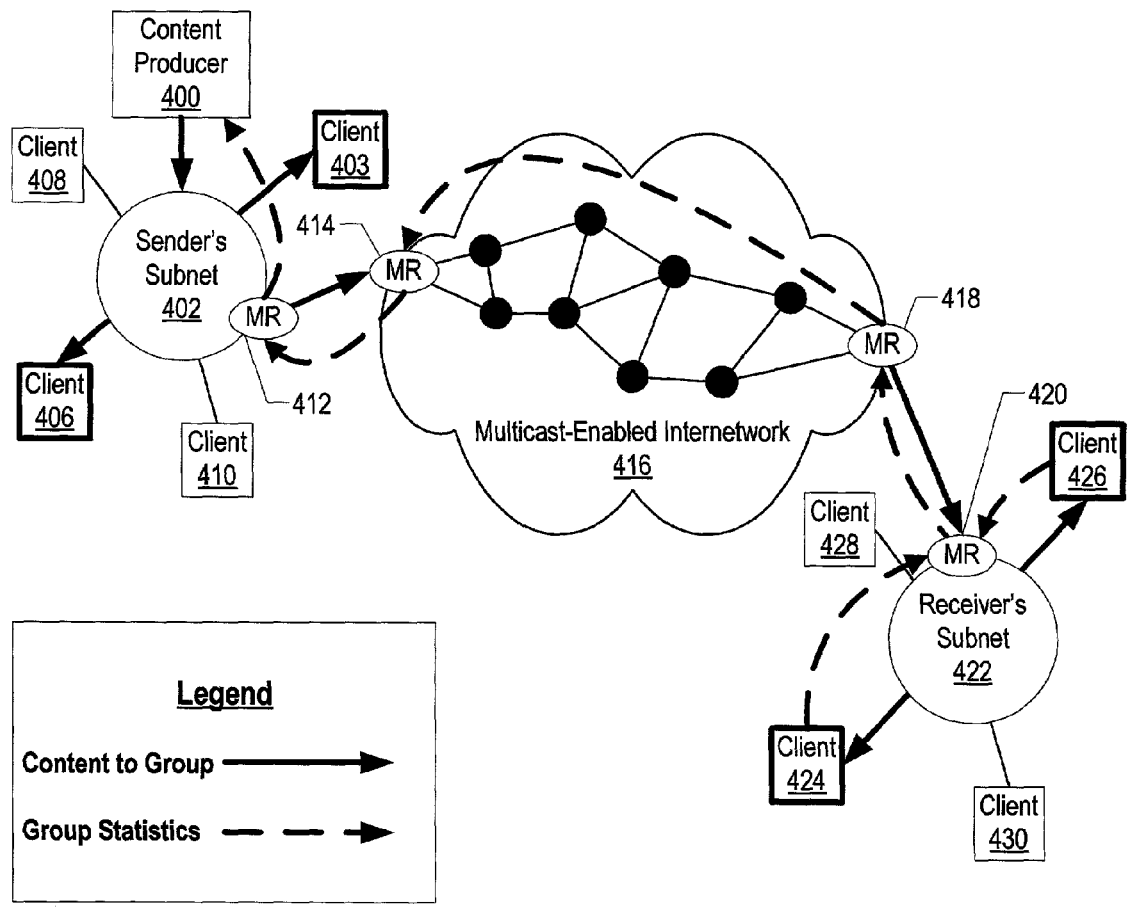
FIG. 4 shows a content producer sending content to several clients using multicast enabled routers and receiving information regarding the number of receivers.

FIG. 4 shows a content producer sending content to several clients using multicast enabled routers and receiving information regarding the number of receivers. Content producer 400 sends the content to sender's subnet 402 where the content is received by two clients (clients 403 and 406) connected to the sender's subnet. These clients previously joined the multicast group to which the content was sent. Two other clients (408 and 410) are also connected to the sender's subnet but do not receive the content because they did not join the group to which the content was sent. Endpoint multicast router 412 communicates with content producer 400 to send the multicast content to the sender's subnet as well as forwarding the content to multicast enabled internetwork 416. In addition, upon request, endpoint router 412 provides content provider 400 with information regarding the devices that have joined the group to which the content is sent. This information includes the number of receivers that have joined the group. Content producer 400 uses the information regarding receivers in a number of ways. For example, the content producer can derive receiver statistics in order to set pricing for advertisements. Furthermore, in a pay-per-view setting, content producer 400 can use the information to compare the number of receivers with the number of paid subscribers. This comparison can be used to change the multicast group address in an effort to reduce the number of illicit receivers. As used herein, the term "illicit receiver" refers to a user or device that has joined a multicast group but has not been authorized (i.e., has not paid) to receive the content.

Sender's subnet 402 includes multicast enabled router 412 which forwards the content to multicast enabled router 414 which is interconnected to multicast enabled internetwork 416. The content travels through multicast enabled internetwork 416 on its way to other clients who joined the group but are not connected to the sender's subnet, such as clients connected to receiver's subnet 422.

The content arrives at multicast enabled router 418 which forwards the content to multicast enabled router 420 that is included in receiver's subnet 422. The content is transmitted by multicast enabled router 420 to clients within receiver's subnet 422. Two of the clients (424 and 426) included in receiver's subnet 422 previously joined the group to which the content was sent and therefore receive the content. Two other clients (428 and 430) are included in the receiver's subnet but do not receive the content because they did not join the group to which the content was sent.

Multicast enabled router 420 gathers statistics from the receivers in receiver's subnet 422 and transmits the statistics through multicast enabled network 416 to ultimately arrive at endpoint router 412. Other "Designated Routers" included in other subnets transmit statistics for the receivers within the subnet back to Endpoint Router 412 in the same manner. In this fashion, Endpoint Router 412 ultimately collects receiver statistics for all receivers throughout the computer network, such as the Internet.

Figure 5:
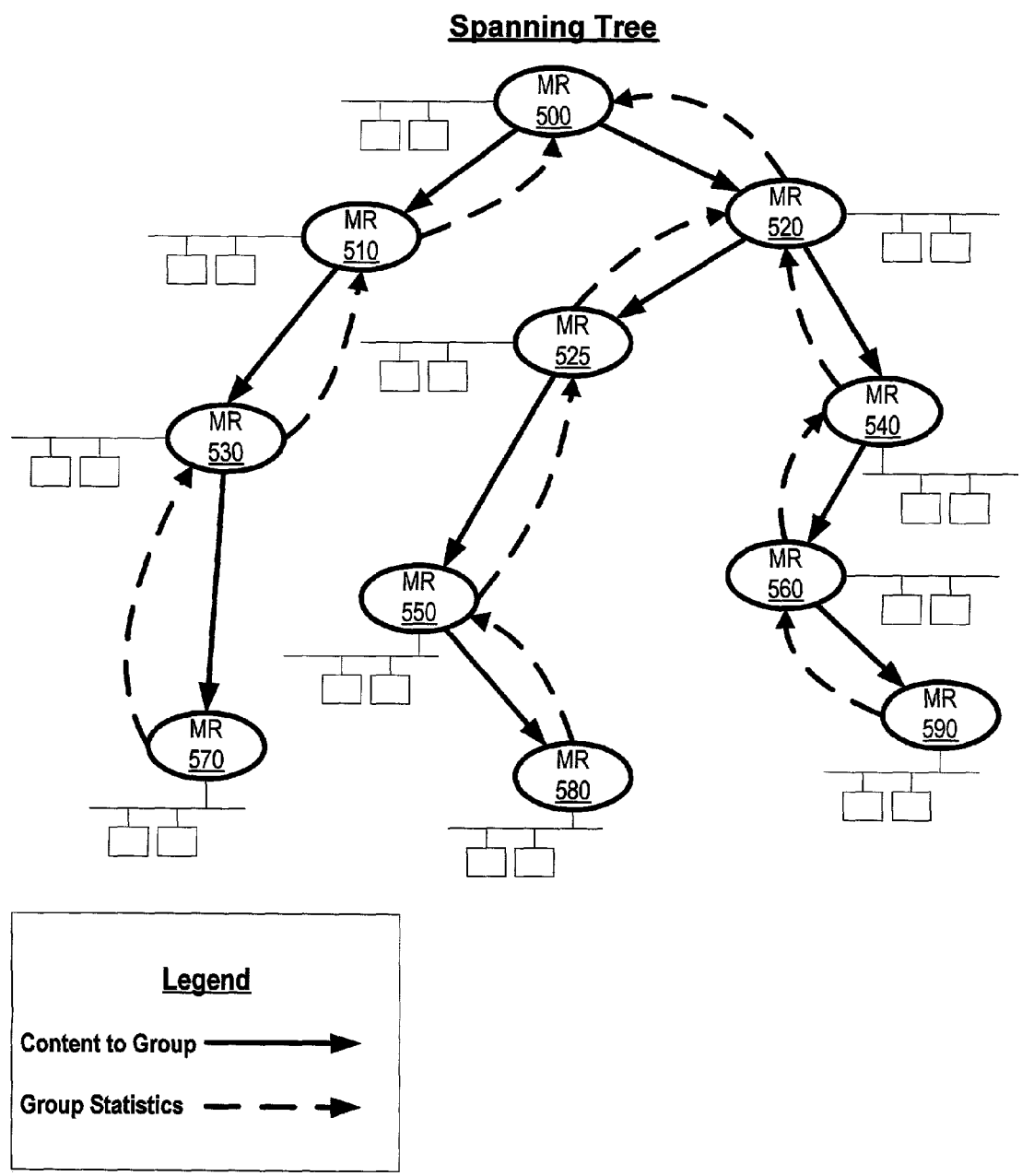
FIG. 5 shows a spanning tree wherein the tree is used for downstream multicast transmission and upstream transmission regarding receiver information.

FIG. 5 shows a spanning tree wherein the tree is used for downstream multicast transmission and upstream transmission regarding receiver information. As used herein, the term "downstream" is used to refer to data transmitted from the content producer (or the content producer's router) to the client (or the client's router, and the term "upstream" is used to refer to data transmitted from the client (or the client's router) to the content producer (or the content producer's router). As depicted in FIG. 5, downstream transmissions are shown as solid lines and upstream transmissions are shown as dashed lines. Designated Routers are shown for several different subnets, much like the routers shown in FIG. 3. However, in FIG. 5, receiver information is passed upstream along the spanning tree where it ultimately reaches Endpoint Router 500. Endpoint Router 500 serves as the Designated Router for the content producer's subnet.

As can be seen, there is one path a transmission can take to reach any given router. Starting at Endpoint Router 500, transmissions destined for subnets covered by Designated Router 510, 530, or 570 take the left most branch from router 500. Conversely, when receivers join the group, Designated Router pass the information up the spanning tree where it ultimately reaches Endpoint Router 500. Transmissions destined for other subnets covered by Designated Routers 520, 525, 550, 580, 540, 560, or 590 take the right most branch from Endpoint Router 500. Designated Router 520 is used to branch messages between its left branch which covers Designated Routers 525, 550, and 580, and its right branch which covers Designated Routers 540, 560, and 590. Each of these Designated Routers send receiver information that is transmitted back to Endpoint Router 500. A content producer can then query the receiver statistics from one or more endpoint routers in order to determine the number of devices receiving the multicast group transmission. Multicast transmissions use the spanning tree shown in FIG. 5 to ensure that any given subnet only receives one copy of the transmission, thus conserving network bandwidth. In addition, the spanning tree ensures that each receiver is counted accurately so that the endpoint router (or multiple endpoint routers) tallies an accurate count of the total number of devices that have joined the group to receive the transmission. In one embodiment, each Designated Router keeps a tally of all group join requests that have been received in the Designated Router's subnet as well as all Designated Routers that are downstream of the particular Designated Router. In this manner, the intermediate Designated Routers keep track of tallies that are subtotals of the total number of devices that have joined the group and the Endpoint Router stores the total tally of all devices that have joined the group on any Designated Router included in the spanning tree.

Figure 6:
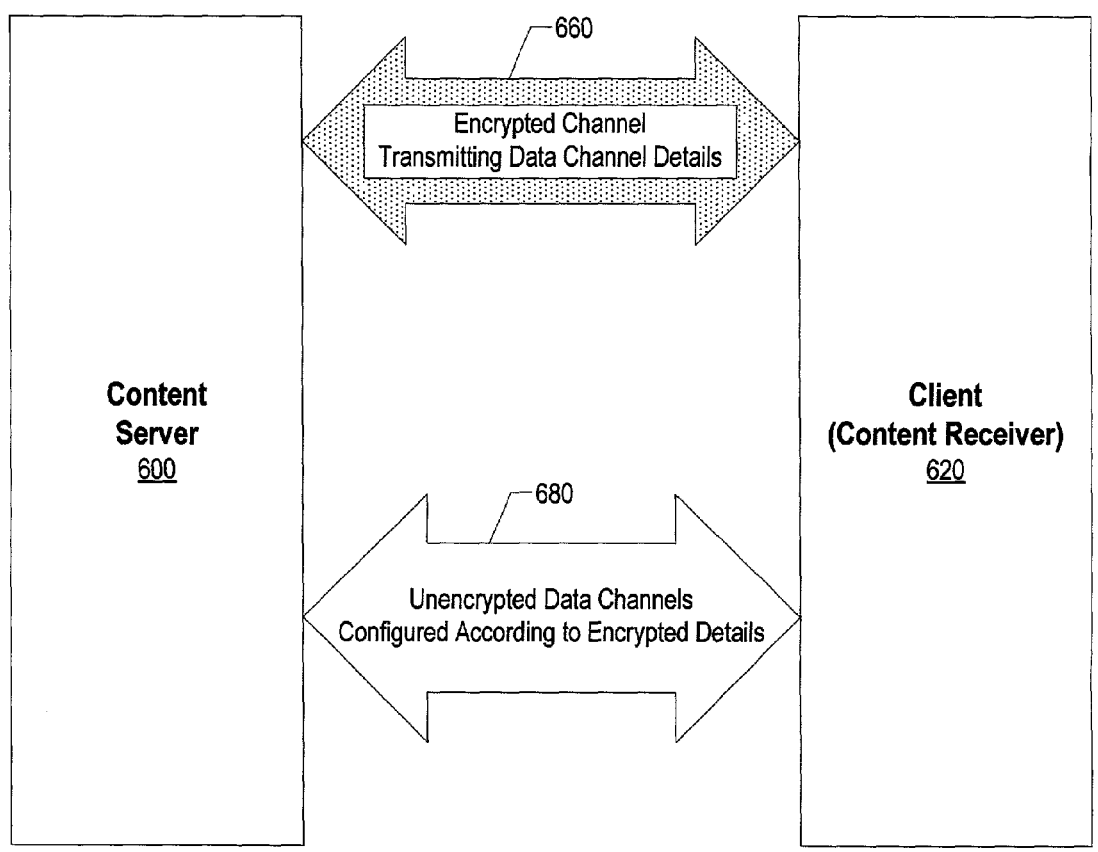
FIG. 6 shows a high level diagram of two channels being used to transmit multicast content.

FIG. 6 shows a high level diagram of two channels being used to transmit multicast content. Content server 600 provides content, such as televised broadcasts and pay-per-view events as well as other types of content, to one or more clients 620.

Encrypted channel 660 is established between each of the clients and the content server. Encrypted channel 660 supports unicast transmissions between the clients and the server so that each client has its own encrypted channel established with the content server. The encrypted channel is secured using encryption technology, such as Secure Socket Layers (SSL), which is a widely used Internet encryption technology. Encrypted channel 660 is used to transmit details regarding unencrypted data channel 680 which is used by the content server in transmitting content.

Data channel details includes details such as a multicast group address through which the content is transmitted, a port number corresponding to a server port from which the content can be received, etc. The encrypted channel may remain open between the server and the clients, during which time unencrypted data channel details can be repeatedly sent allowing the content server to "switch" data channels periodically, thus making it difficult for illicit receivers to receive an uninterrupted transmission across unencrypted data channel 680. Encrypted channel 660 may also be a temporary channel through which a "switching algorithm" is securely sent from the content server to the various clients. The switching algorithm would then be used by both the content server and clients to switch channels periodically (i.e., according to the algorithm), thus making illicit reception of the unencrypted data channel quite difficult.

By using encrypted channel 660 to provide details regarding unencrypted data channels 680, the encrypted transmission needs are reduced, thus reducing bandwidth requirements. In addition, the encrypted data channel allows content server 600 to take advantage of multicast broadcast technology while reducing or eliminating the number of illicit receivers. Furthermore, by not encrypting the content, the size of the content packets is potentially reduced and the decrypting requirements of both the content server and client are reduced. The amount of "choppy" transmissions of multimedia content caused by delays in encrypting and decrypting the content is thus reduced and overall transmission quality is improved.

Figure 7:
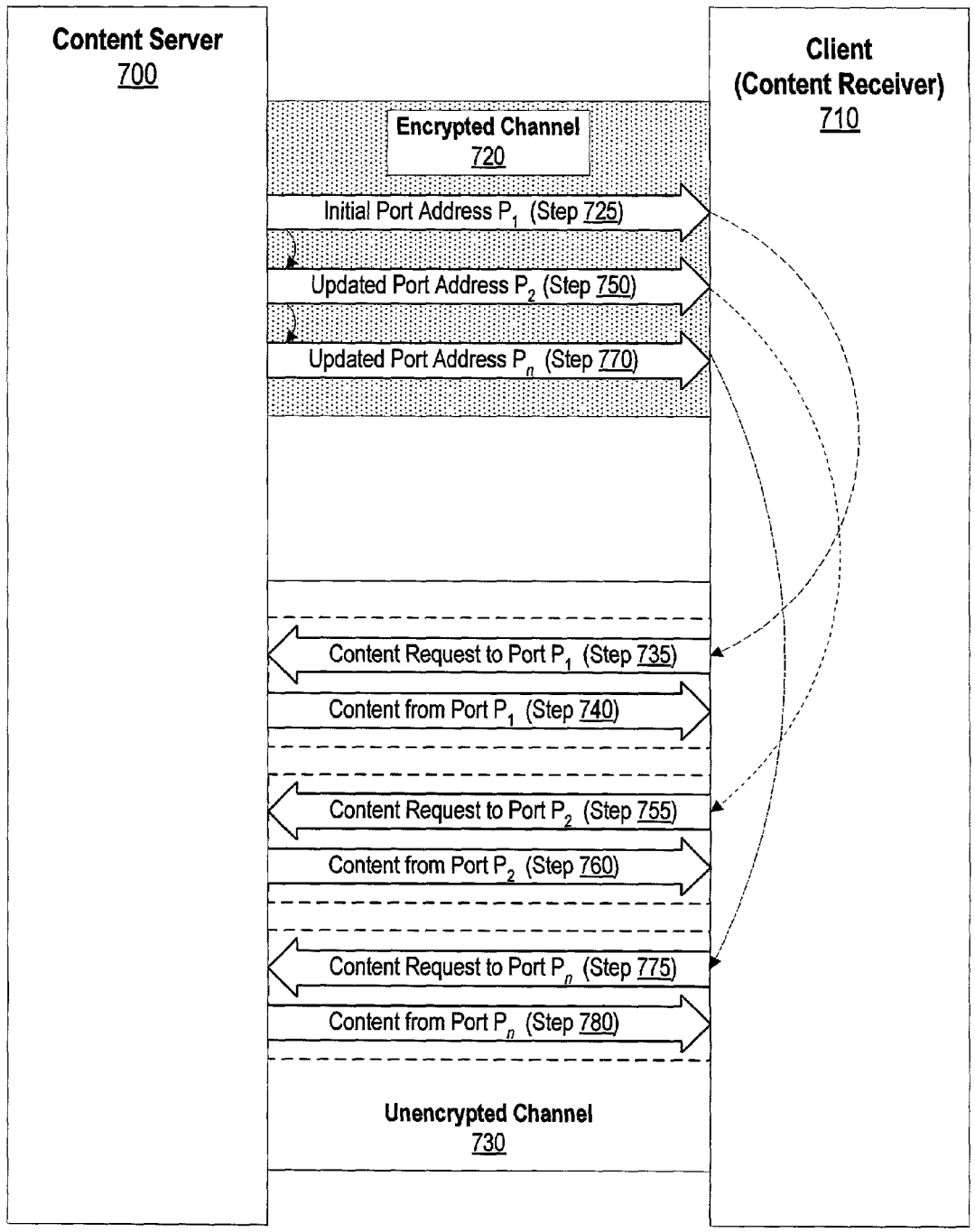
FIG. 7 shows a block diagram of an encrypted channel used to transmit port information and an unencrypted channel used to receive content from the designated ports.

FIG. 7 shows a block diagram of an encrypted channel used to transmit port information and an unencrypted channel used to receive content from the designated ports.

Content server 700 establishes encrypted channel 720 with one or more client devices 710. Port information is transmitted over encrypted channel 720 which is used to control content transmissions across unencrypted channel 730.

In the example shown, an initial port address ($P_1$) is transmitted from content server 700 to client 710 across encrypted channel 720 (step 725). The client uses the initial port address to request content from the content server's port $P_1$ (step 735) across unencrypted channel 730. Content server 700 responds by sending content from port $P_1$ across unencrypted channel 730 back to the client (step 740). Port $P_1$ can be used for a single packet or can be repeatedly used for some amount of time until content server 700 changes the port address by sending updated port address $P_2$ to client 710 across the encrypted channel (step 750). In a multicast setting, a content provider can use a group of multicast group addresses to switch delivery from one group to another. Again, the port address ($P_2$) is used by the client to request content from the content server's port $P_2$ (step 755), and again the content server responds by transmitting content from the port ($P_2$) back to the client over the unencrypted channel (step 760). This process of changing port addresses can be invoked numerous times, illustrated by content server sending updated port $P_n$ to client (step 770), the client requesting content from port $P_n$ over the unencrypted channel (step 775), and the content server responding by sending additional content from port $P_n$ back to the client over the unencrypted channel (step 780). The process of changing ports can be used in a multicast group setting where the receivers receive content using a given multicast group address and port identifier, or can be used in a unicast setting where each client has its own unencrypted unicast transmission path between content server 700 and the respective client.

Figure 8:
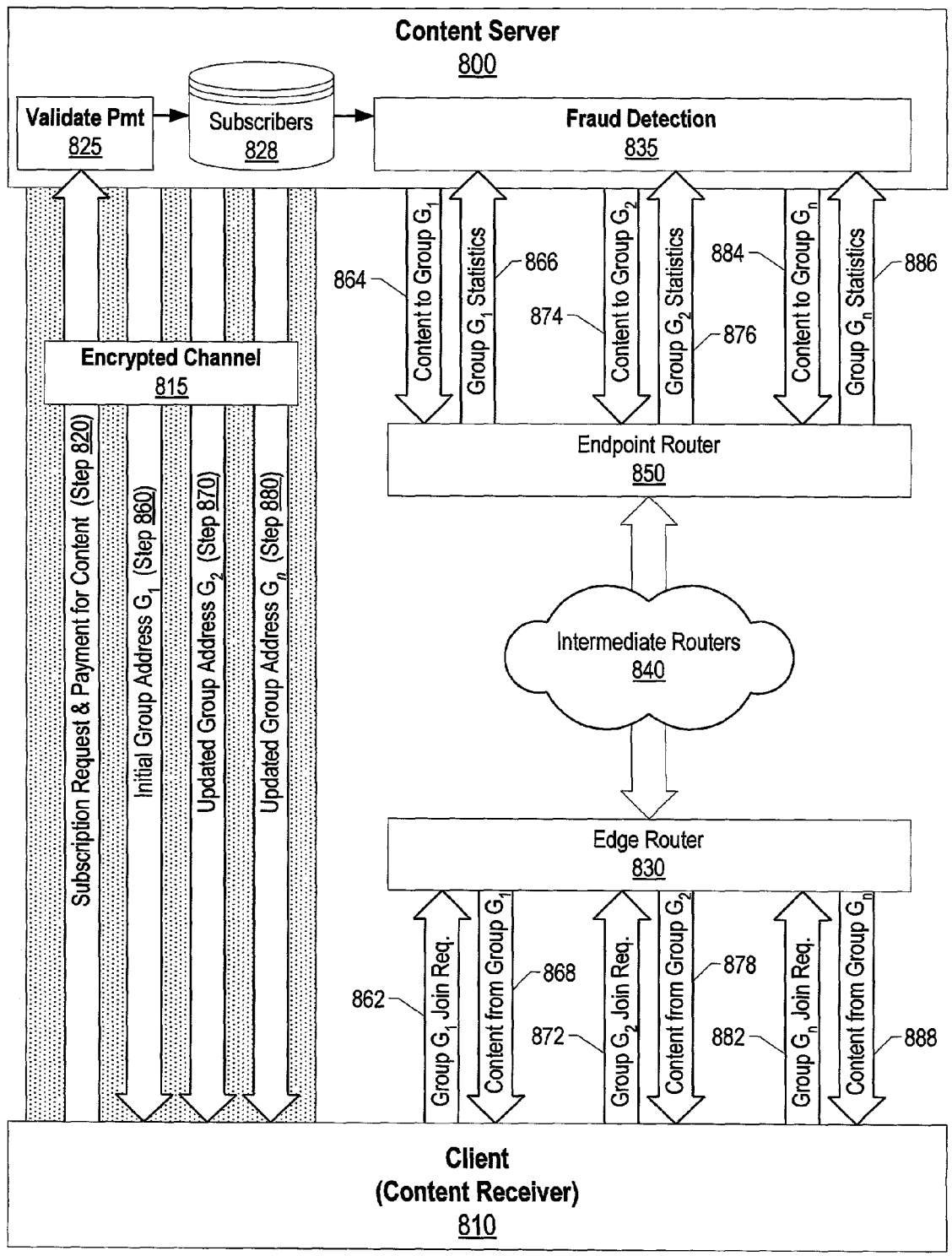
FIG. 8 shows a block diagram of an encrypted channel being used to transmit multicast group information and multicast content being transmitted according to the multicast group designations.

FIG. 8 is a block diagram of an encrypted channel being used to transmit multicast group information and multicast content being transmitted to according to the multicast group designations. Encrypted channel 815 is established between content server 800 and client 810 (the content receiver).

In a pay-per-view setting, client 810 sends a content subscription request and payment data (such as credit card information) across encrypted channel 815 to content server 800. Content server 800 validates the client's payment data (step 825). If the client's payment data is satisfactory, content server 800 replies with the initial multicast group address ($G_1$) sent across encrypted channel 815 to the client (step 860). Content server also stores information regarding the validated subscription in subscription data store 828.

Client 810 uses the initial group address ($G_1$) to send a request to the Designated Router of its subnet (Edge Router 830) to join the group identified as $G_1$ (step 862). The Designated Routers that receive group join requests for group $G_1$ pass the receiver statistics up the spanning tree (intermediate routers 840) where they are received by the Designated Router for the content server's subnet (Endpoint Router 850) at step 866. The flow of receiver statistics continues as more devices join group $G_1$. In addition to tally information, the receiver information provided in step 866 can include the depth of the spanning tree (i.e., the distance between the endpoint router and the furthest client subnet). This information is used to set an appropriate Time-To-Live (TTL) in the multicast packet transmission. For example, if the furthest receiver in the spanning tree is five Designated Routers down from Endpoint Router 850, then the TTL would be set to five. In this manner, the content is not transmitted further along the network than is necessary to satisfy the current set of receivers, thus conserving network bandwidth.

When the time to broadcast arrives, content server 800 sends content to the initial group $G_1$ (step 864). The content travels down the spanning tree where it is received and retransmitted by each Designated Router that have at least one receiver that has joined group $G_1$. The Designated Routers with at least one receiver retransmit the content on the Designated Router's subnet as well as forwarding the content to one or more other Designated Routers that are downstream in the spanning tree (so long as the content packet's TTL is greater than one). The content is then sent from the client's Designated Router to the client (step 868) whereupon an application program running on the client receives and processes the data (i.e., plays video and audio to the user using the computer's display screen and sound device).

Fraud detector process 835 compares the number of receivers that have joined group $G_1$ with the number of paid subscribers stored in data store 828. If the comparison reveals a number of illicit receivers (above a fraud threshold level set by the content server), content server 800 changes the group from $G_1$ to $G_2$ and sends the new group address to the clients over the encrypted channel (step 870). The client, in turn, sends a request to its Designated Router (Edge Router 830) to join the $G_2$ multicast group (step 872). The statistics (i.e., tally) for the client join requests is transmitted upstream through the spanning tree (intermediate routers 840) where it eventually is received by the content server's Designated Router (Endpoint Router 850). In addition, content server 800 sends content to the new group ($G_2$, step 874) whereupon it is transmitted downstream through the spanning tree where it is sent by the client's Designated Router to the client device (step 878).

Fraud detector process 835 now compares the number of join requests for group $G_2$ with the number of actual subscriptions from subscription data store 828. In this manner, content server 800 can repeatedly change the group address to which content is transmitted, as illustrated by the content server sending updated group address $G_n$ (step 880) across encrypted channel 815 whereupon the client joins group $G_n$ (step 882) and group statistics (i.e., tally information) is received by the content server (step 886) from the Endpoint Router. The content server transmits content (step 884) to the new group ($G_n$) whereupon it travels down the spanning tree and is received by the client device (step 888).

One embodiment uses an algorithm to determine when the group address changes in lieu of fraud detection component 835. In this embodiment, the algorithm is transmitted to the client across encrypted channel 815. Thereafter, the content server and client each change the channel address that is used for transmitting and joining, respectively. Using an algorithm allows encrypted channel 815 to be closed after the client has received the channel switching algorithm. For example, the channel switching algorithm might change the multicast group address from $G_1$ to $G_2$, etc. after a certain number of content packets have been transmitted. In this way, the client and the server synchronize their transmission channels and hop through a sequence of channels over a predetermined interval in a predetermined manner.

Figure 9:
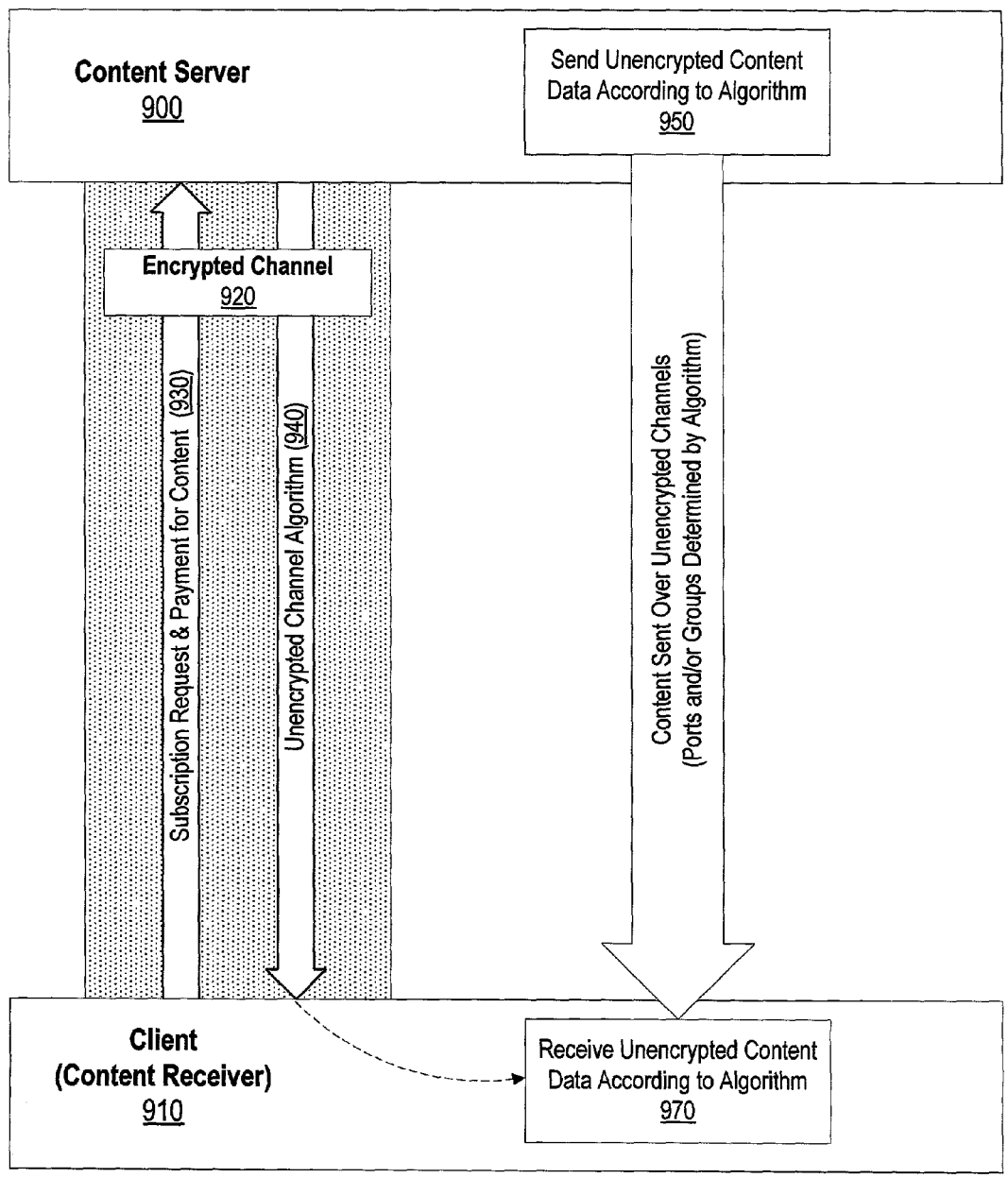
FIG. 9 shows a block diagram of an encrypted channel used to transmit an algorithm that is used by the sender and receiver to send and receive multicast content transmitted over an unencrypted channel.

FIG. 9 is a block diagram of an encrypted channel used to transmit an algorithm that is used by the sender and receiver to send and receive multicast content transmitted over an unencrypted channel. Encrypted channel 920 is established between content server 900 and client 910. In a pay-per-view setting, the client sends a subscription request and payment to the content server across the encrypted channel (step 930). Upon validation of the client's payment data, the content server sends an algorithm to the client that determines the port and/or multicast group address that will be used for content transmissions (step 940). Thereafter, content server 900 sends content across unencrypted channel 960 using the details determined by the switching algorithm. The client, in turn, uses the same switching algorithm for receiving the content. For example, the switching algorithm may be programmed so that content is directed to a different group address and port number every time ten content packets have been received.

Figure 10:
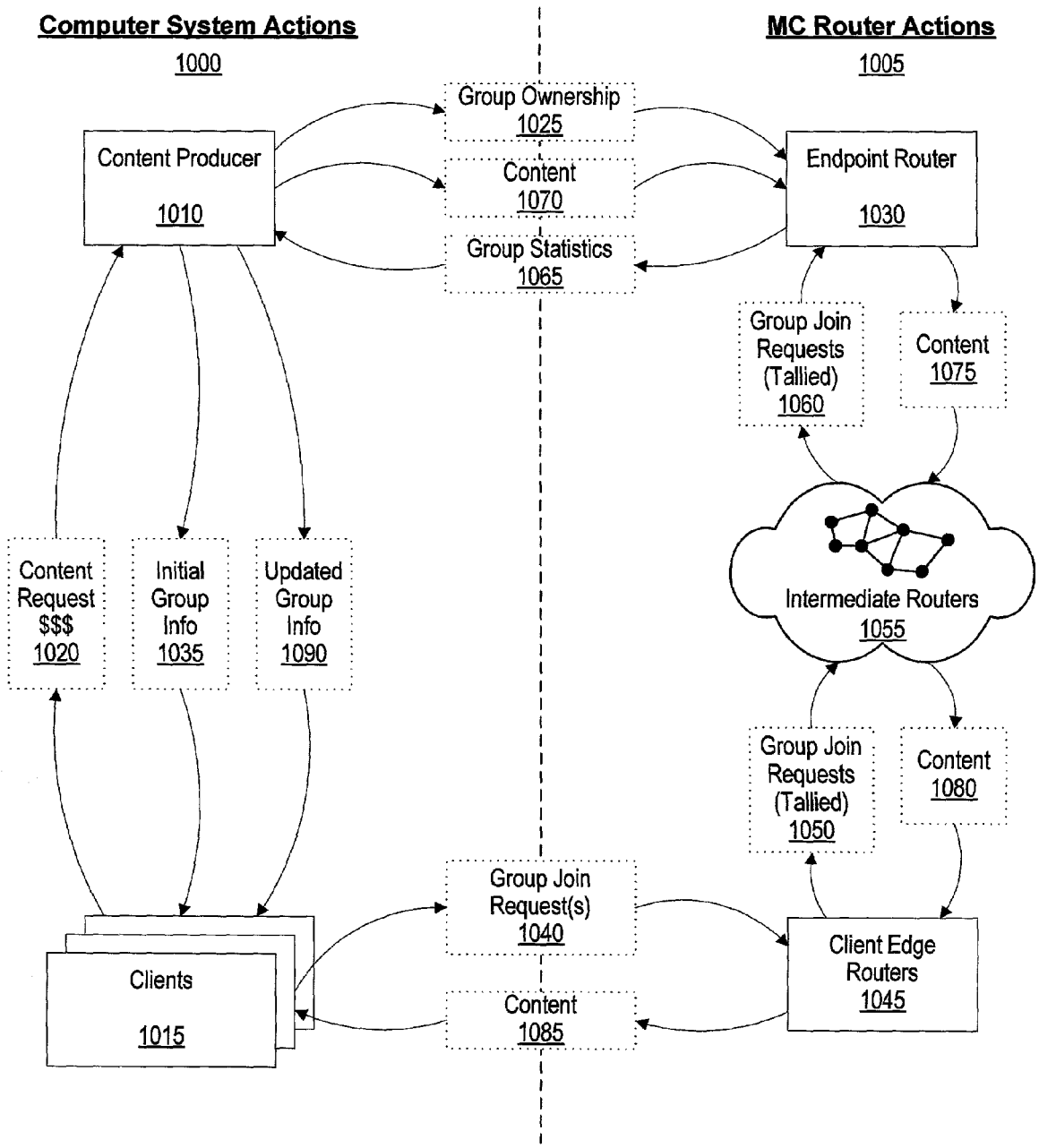
FIG. 10 shows a high level diagram of steps taken by the content producer, receivers, and multicast routers to both send multicast content to the receivers and receive data collected regarding the receivers.

FIG. 10 shows a high level diagram of steps taken by the content producer, receivers, and multicast routers to both send multicast content to the receivers and receive data collected regarding the receivers. The diagram is divided between computer system actions 1000 shown on the left side of the diagram and multicast router actions shown on the right side of the diagram.

Computer system actions 1000 include actions by content producer 1010 as well as actions undertaken by clients 1015. Multicast router actions 1005, on the other hand, include those actions taken by the Designated Router for the content producer's subnet (Endpoint Router 1030), those taken by the Designated Routers for the clients' subnets (Client Edge Routers 1045), as well as intermediate routers 1055 used to form spanning trees to transmit data between Endpoint Router 1030 and Client Edge Routers 1045.

Clients 1015 contact content producer 1010 using a network interface, such as an Internet web page. The clients request content and pay the content fee (message 1020). The content producer initializes the initial multicast group by sending a group creation request (message 1025) to the Designated Router included in the content producer's subnet (Endpoint Router 1030). Content producer 1010 processes the client request and, if the client's payment is validated, return initial group information to the client (message 1035).

The client uses the received initial group information to send a "join" request (message 1040) to the Designated Router included in the client's subnet (Client Edge Router 1045). The client's edge router increases its multicast group tally corresponding to the group and sends its group join request (message 1050) upstream through the spanning tree (intermediate routers 1055). In one embodiment, Client Edge Router 1045 also includes data indicating the number of levels in the spanning tree between the endpoint router and the edge router. The number of levels, or depth, in the spanning tree can be used during content broadcasting to limit the number of routers that receive the content in order to conserve network bandwidth. The spanning trees originating from Endpoint Router 1030 (intermediate routers 1055) send group information, including the number of devices that have joined the multicast group (message 1060).

Periodically, content producer 1010 requests group statistics corresponding to the multicast group from Endpoint Router 1030. These statistics, including the number of devices that have joined the group are returned to the content producer (message 1065). The content producer compares the statistics with the number of paid content requests (message 1020) that have been received. If the number of group join requests exceeds the number of paid subscriptions, the content producer can conclude that a certain number of illicit receivers have joined the multicast group. When the content producer decides that too many illicit receivers are receiving the content, the producer can change the group by establishing a new multicast group (message 1025) and transmitting the new group's address to the list of subscribers (message 1090). The transmission of the new multicast group's address can be done in a secure (i.e., encrypted) manner to prevent the illicit receivers from determining the address of the new multicast group.

In one embodiment the multicast group information returned from the client included the number of levels, or depth, of the spanning tree. The greatest number of levels is used to establish the content packet's "time-to-live" (TTL). For example, if all group join requests were from the content producer's own subnet, the greatest depth would be "1," and the TTL for the content packets would be set to 1. The Designated Router for the content producer's subnet (Endpoint Router 1030), in this case, would not transmit the packet to other adjacent Designated Routers for other subnets. However, if the greatest number of levels for a client was found to be five, the Endpoint Router would transmit the content packet to adjacent Designated Routers. These adjacent Designated Routers would transmit the content packets on their own subnets, decrement the TTL value from five to four, and forward the packet to other Designated Routers in the spanning tree. This forwarding of the content downstream through the spanning tree continues until the TTL for the packet is decremented to one, whereupon it is transmitted within the last subnet but is not forwarded to other adjacent routers.

Content producer broadcasts content to the multicast group by sending packets containing content (content packet 1070) to Endpoint Router 1030. The group address to which the content is sent can change, as described above, in order to thwart the efforts of illicit receivers. The endpoint router forwards content packets 1075 downstream through the spanning tree (intermediate routers 1055). In this manner, content packets 1080 are received by the Designated Router for the client's subnet (client edge router 1045) and transmitted within the subnet where content packets 1085 are received by the client's device.

Figure 11:
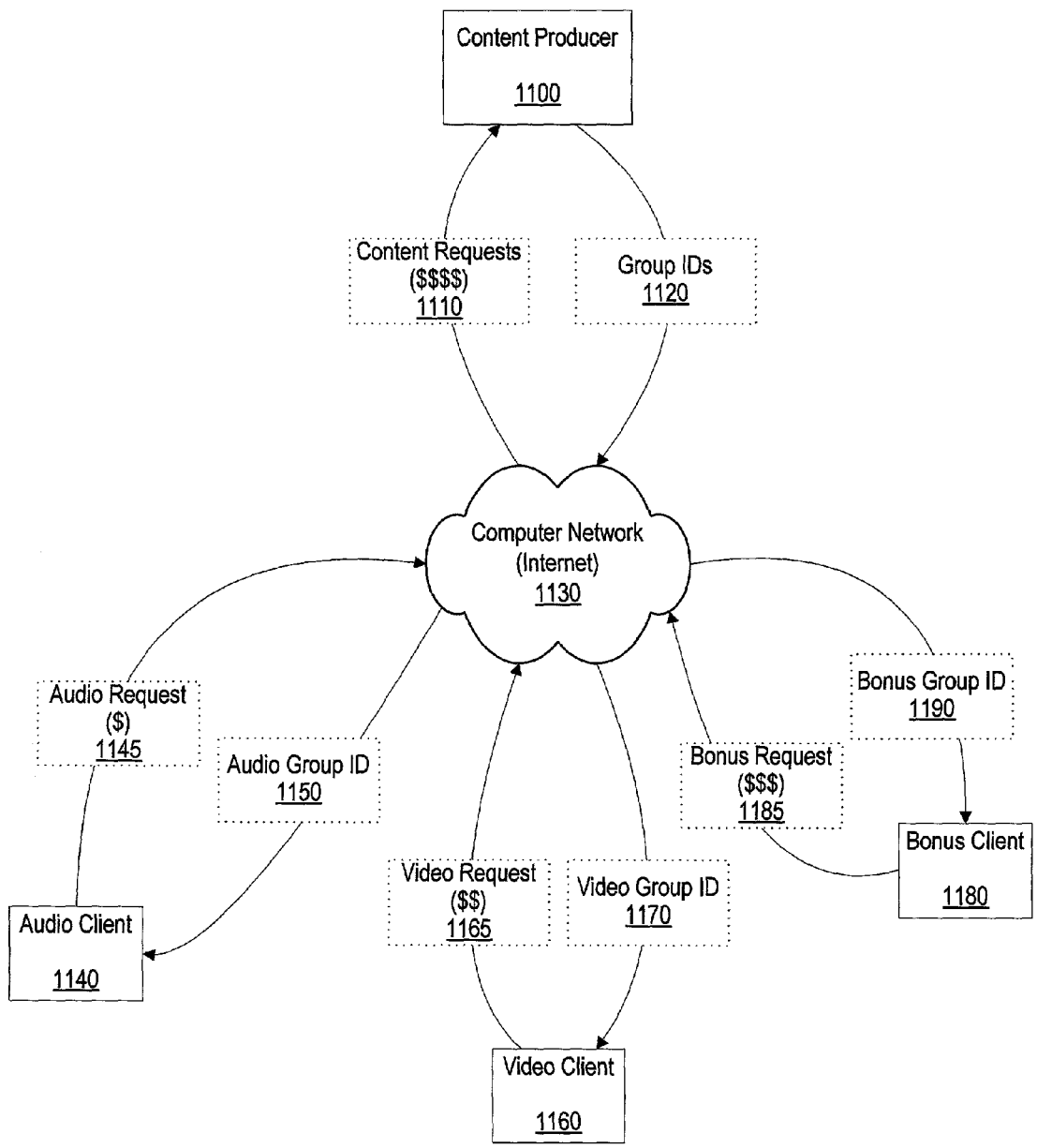
FIG. 11 shows a high level diagram of different types of multicast content transmitted to different types of receivers based upon the receiver's request.

FIG. 11 shows a high level diagram of different types of multicast content transmitted to different types of receivers based upon the receiver's request. Content Producer 1100 receives various types of content requests along with payment information from various client (message 1110). The content request, and payment, may be based upon a level of content, such as "budget," "normal," and "premium." In a pay-per-view multimedia environment, such as a sporting event, the budget content may only include an audio stream, while the normal content includes both audio and video streams. The premium stream includes the audio, video, and other multimedia material, such as interviews with players and statistics for the players. Depending upon the type of content the user requests, the content producer returns a group address corresponding to the client's content selection (message 1120). A hierarchy of groups can be used by the content producer with a part of the group address representing the type of content delivered to the group.

Messages to and from clients and the content producer are transmitted through computer network 1130, such as the Internet. Budget client sends budget request 1145 through the computer network and receives a multicast group identifier (message 1150) corresponding to the audio content.

Likewise, standard 1160 client sends standard request 1165 through the computer network and receives a multicast group identifier (message 1170) corresponding to the audio and video content. In one embodiment, the standard client receives two group identifiers—one for the audio content and another for the video content. In this manner, bandwidth is conserved by having the client's device receive two packets (one audio, one video) and combining the packets in the multimedia presentation.

Similarly, premium client 1180 sends premium request 1185 through the computer network and receives a multicast group identifier (message 1190) corresponding to the premium content. In one embodiment, the premium client receives three or more group identifiers—one for the audio content, another for the video content, and a third for the premium content that is in addition to the standard audio and video. Again, bandwidth is conserved by having the client's device receive the packets (audio, video, premium) and combining the packets in the multimedia presentation.

For each of the levels of content described above, the content producer is able to detect illicit receivers and change the multicast group identifier(s) accordingly. See FIG. 10, above, for details regarding how the content producer detects illicit receivers and changes multicast group identifiers (i.e., the group address).

Figure 12:
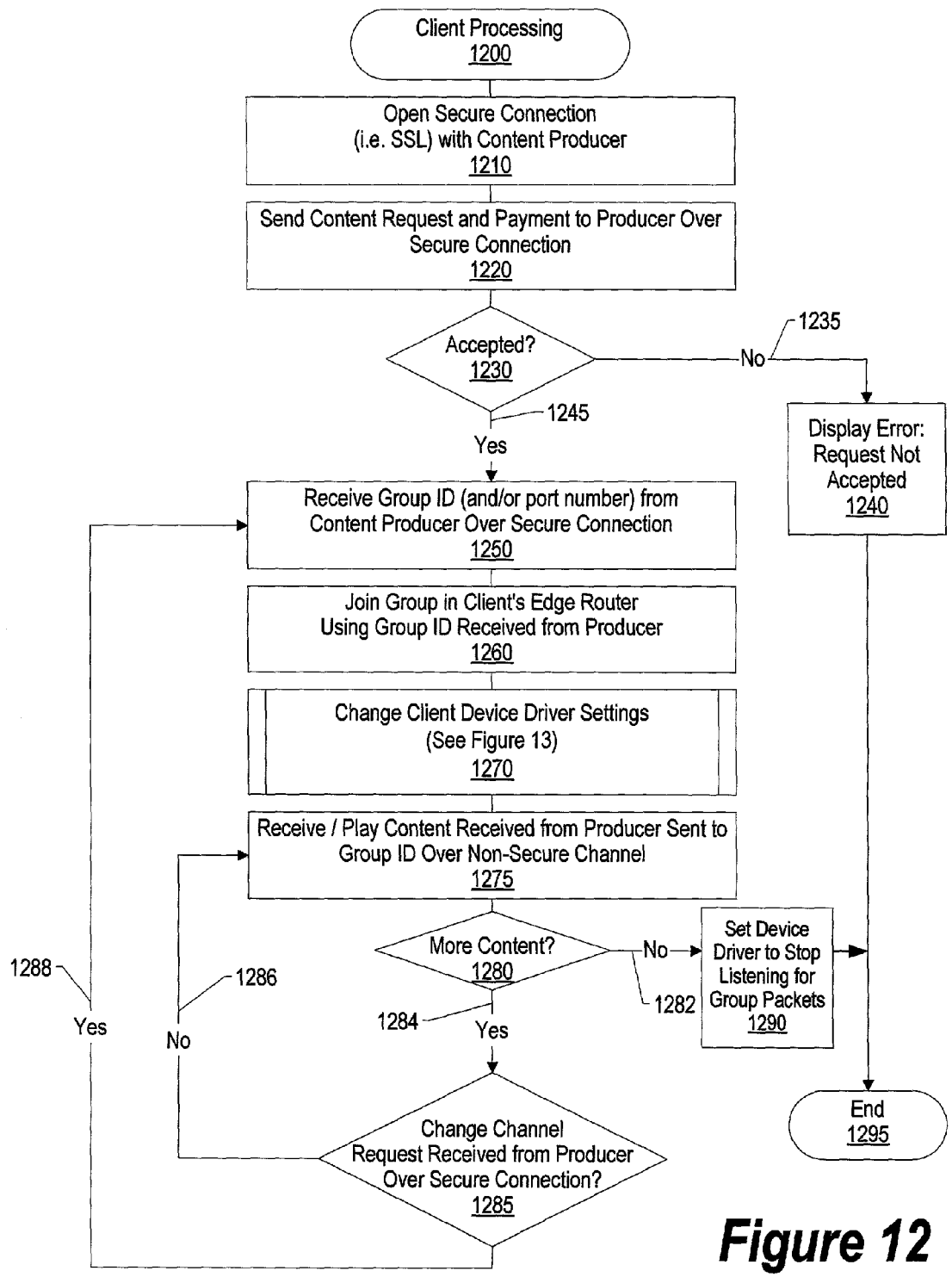
FIG. 12 shows a flowchart for client processing of subscribing to a multicast transmission and receiving the transmission.

FIG. 12 shows a flowchart for client processing of subscribing to a multicast transmission and receiving the transmission. Processing commences at 1200 whereupon the client establishes a secure connection between the client's device and the content producer (step 1210). In an Internet setting, a secure connection can be established using encryption techniques, such as Secure Socket Layers (SSL). The client sends a content request along with payment information for the request (step 1220). For example, the client may request to see a live pay-per-view sporting event on the client's device, such as a computer system or television. The client's payment information can include credit card billing information so that the sporting event is charged to the client's credit card.

A determination is made as to whether the client's request and payment information was accepted by the content provider (decision 1230). If the request and payment information was not accepted by the provider, decision 1230 branches to "no" branch 1235 whereupon an error message is displayed to the user (step 1240) and processing ends at 1295. On the other hand, if the request and payment information was accepted by the content provider, decision 1230 branches to "yes" branch 1245 and processing continues.

The client receives an initial group identifier and/or port number from the content producer over the secure connection (step 1250). In a multicasting environment, the client sends a request to the Designated Router for the client's subnet requesting to join the group identified by the content producer (step 1260). In a unicast environment where the producer periodically changes ports to reduce illicit receivers, the client requests content from the port identified by the producer in step 1260.

Figure 13:
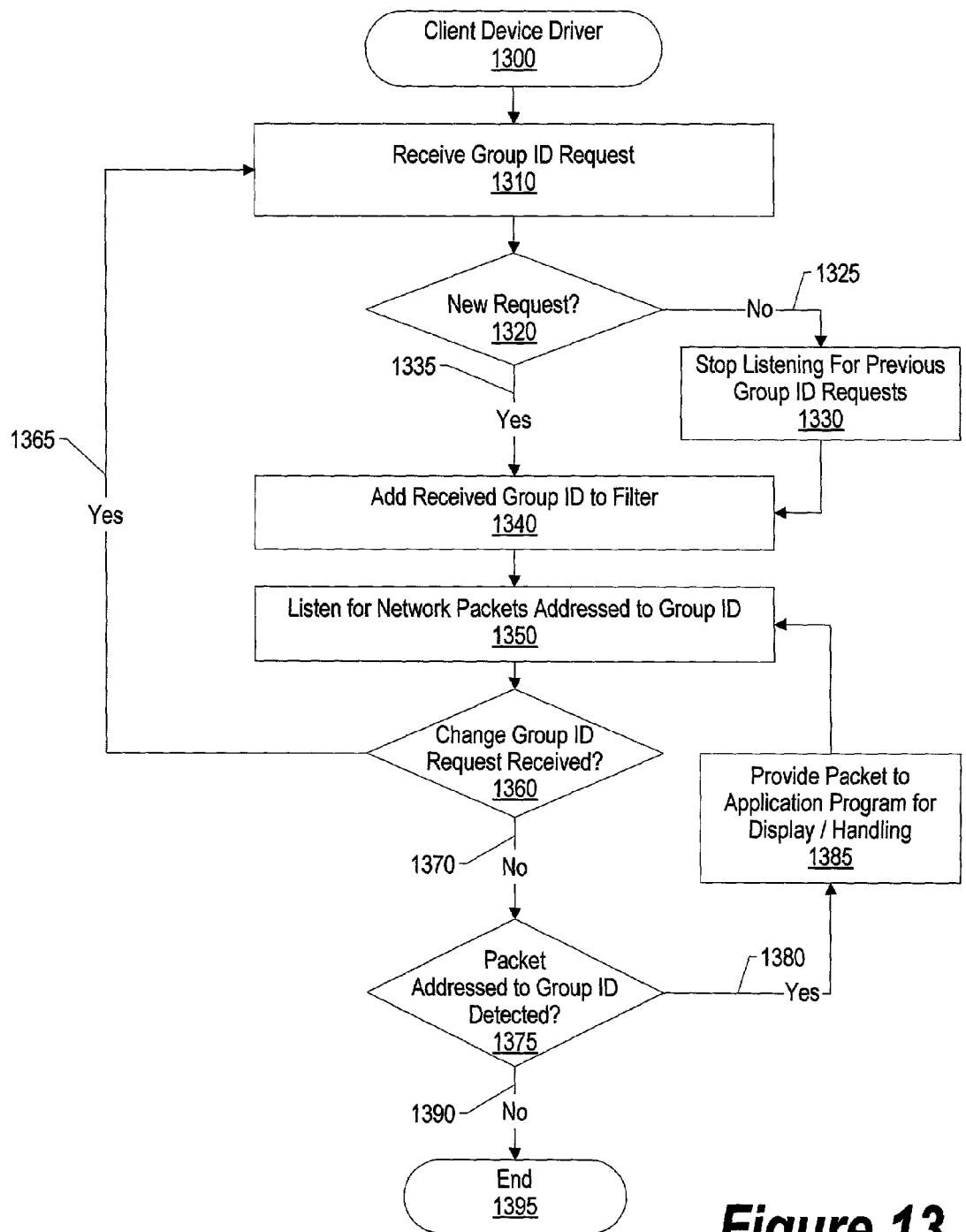
FIG. 13 shows a flowchart for client driver processing to receive multicast content and periodically change group designations.

In a multicast environment, the client changes its network device driver settings to listen for content packets that have been transmitted to the multicast group (predefined process 1270, see FIG. 13 for further details). The client receives data over a non-secure channel whereupon a multimedia application program processes the content and delivers it to the user using the display and audio components accessible by the client device (step 1275). In a multicast environment, the content is received from the producer that sent the content to the identified multicast group, while in a unicast environment the content is received from the port number identified by the producer.

A determination is made as to whether there is more content to receive (decision 1280). If there is more content, decision 1280 branches to "yes" branch 1284 to receive and process additional content. This branching continues until the content is finished being received, at which point decision 1280 branches to "no" branch 1282 whereupon the device driver is set to stop listening for the multicast group packets (step 1290) and processing ends at 1295.

Returning to "yes" branch 1284, a determination is made as to whether updated multicast group identifier data or port request data have been received from the content producer over the secure connection (decision 1285). If updated data has not been received, decision 1285 branches to "no" branch 1286 whereupon processing loops back to receive and play additional content packets received over the non-secure channel (step 1275). On the other hand, if updated data has been received, decision 1285 branches to "yes" branch 1288 whereupon processing loops back to receive the updated multicast group information and/or updated port information (step 1250).

FIG. 13 shows a flowchart for client driver processing to receive multicast content and periodically change group designations. Processing commences at 1300 whereupon the device driver receives a multicast group identifier (step 1310). Designated Routers deliver the requested incoming multicast data streams to the Designated Router on the client's subnet, which maps the group address to its associated hardware address and builds the message using this address. The device driver corresponding to the client's network interface card, listening for these addresses, passes the multicast messages to the TCP/IP protocol stack, which makes them available as input to the client's application, such as a video viewer.

A determination is made as to whether the request is an initial multicast group address or an updated multicast group address (decision 1320). If the address is an update to a previous multicast address, decision 1320 branches to "no" branch 1325 whereupon the device driver stops listening for the previous multicast group address (step 1330). On the other hand, if the multicast group address is a new address, rather than an update, decision 1320 branches to "yes" branch 1335 which bypasses step 1330.

The received multicast group address is added to the device driver's filter (step 1320) so that messages addressed to the multicast address will be identified by the client's device driver. The device driver listens for packets addressed to the client device which now, due to adding the multicast address to the device driver's filter, include packets addressed to the multicast group address (step 1350).

A determination is made as to whether a request to change the multicast group address has been received (decision 1360). If such request is received, decision 1360 branches to "yes" branch 1365 which loops back to receive and process the next multicast group address (step 1310 through step 1350). On the other hand, if a request to change the multicast group address is not received, decision 1360 branches to "no" branch 1370 whereupon a determination is made as to whether a packet addressed to the multicast group address was received (decision 1375). If a multicast group packet was received, decision 1375 branches to "yes" branch 1380 whereupon the device driver passes the multicast message to the TCP/IP protocol stack, which makes them available as input to the client's application, such as a video viewer (step 1385) and loops back to listen for more packets. When no more packets are detected (i.e., the client device shuts down or disables its network connection), decision 1375 branches to "no" branch 1390 and device driver processing ends at 1395.

Figure 14:
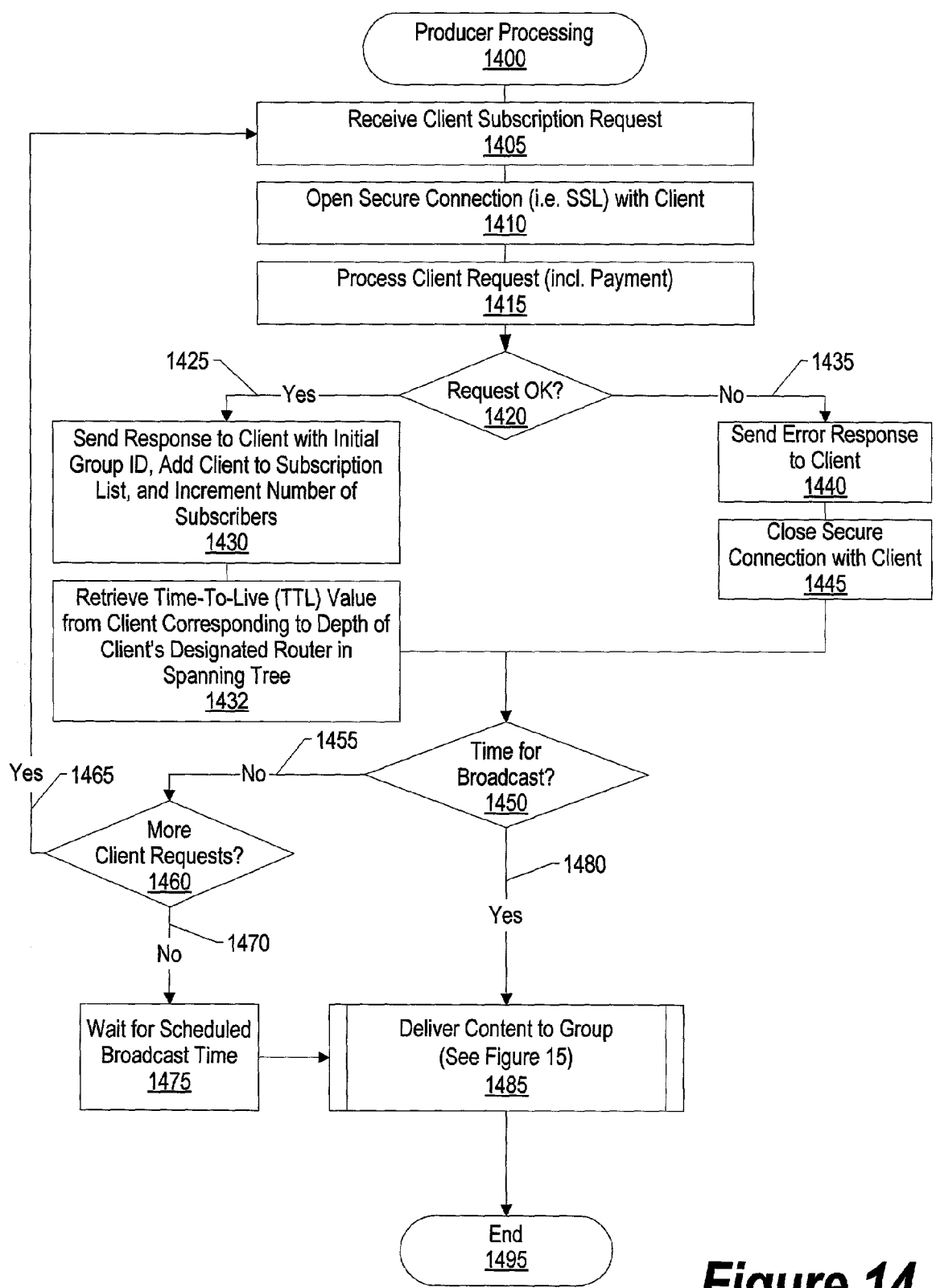
FIG. 14 shows a flowchart for producer processing of client subscriptions to a multicast transmission and transmitting the content.

FIG. 14 shows a flowchart for producer processing of client subscriptions to a multicast transmission and transmitting the content. Processing commences at 1400 whereupon the producer receives a subscription request from a client (step 1405). The producer establishes a secure network connection (i.e., using SSL) with the client device (step 1410). The client sends payment information over the secure connection which is processed by the content producer (step 1415). A determination is made as to whether the client's request is acceptable (decision 1420, i.e., the client's payment information is validated).

If the client's request is accepted, decision 1420 branches to "yes" branch 1425 whereupon a response is sent to the client across the secure connection informing the client's device of the initial multicast group address that the client needs to join, the client is added to a list of subscribers, and the total number of subscribers for the content is incremented (step 1430). In one embodiment, the content producer also receives a "time-to-live" (TTL) value from the client (step 1432). The TTL value corresponds to the depth of the client's Designated Router in the spanning tree. In other words, the TTL value informs the content producer of the number of intermediate routers between the producers Designated Router and the client's Designated Router. The greatest TTL value received for any client is used as the TTL value on multicast group content packets sent by the producer when broadcasting. In this fashion, the TTL value allows the content packets to travel far enough down the spanning tree to reach all subscribers, but does not send the content further down the spanning tree which would unnecessarily use network bandwidth.

On the other hand, if the client's request is not accepted, decision 1420 branches to "no" branch 1435 whereupon an error is sent to the client (step 1440) and the secure connection with the client is terminated (step 1445). A determination is made as to whether it is time to broadcast the multicast content (decision 1450). If it is not yet time, decision 1450 branches to "no" branch 1455 whereupon a decision is made as to whether more client subscription requests have been received (decision 1460). If more client subscription requests have been received, decision 1460 branches to "yes" branch 1465 which loops back to process the next client request. On the other hand, if no more client subscription requests are received, decision 1460 branches to "no" branch 1470 whereupon the content producer process waits for the scheduled multicast content broadcast time (step 1475).

When it is time for the multicast content broadcast, decision 1480 branches to "yes" branch 1480 or, alternatively, control is released from step 1475. In either event, the content is delivered to the multicast group (predefined process 1485, see FIG. 15 for further details). Processing thereafter ends at 1495.

Figure 15:
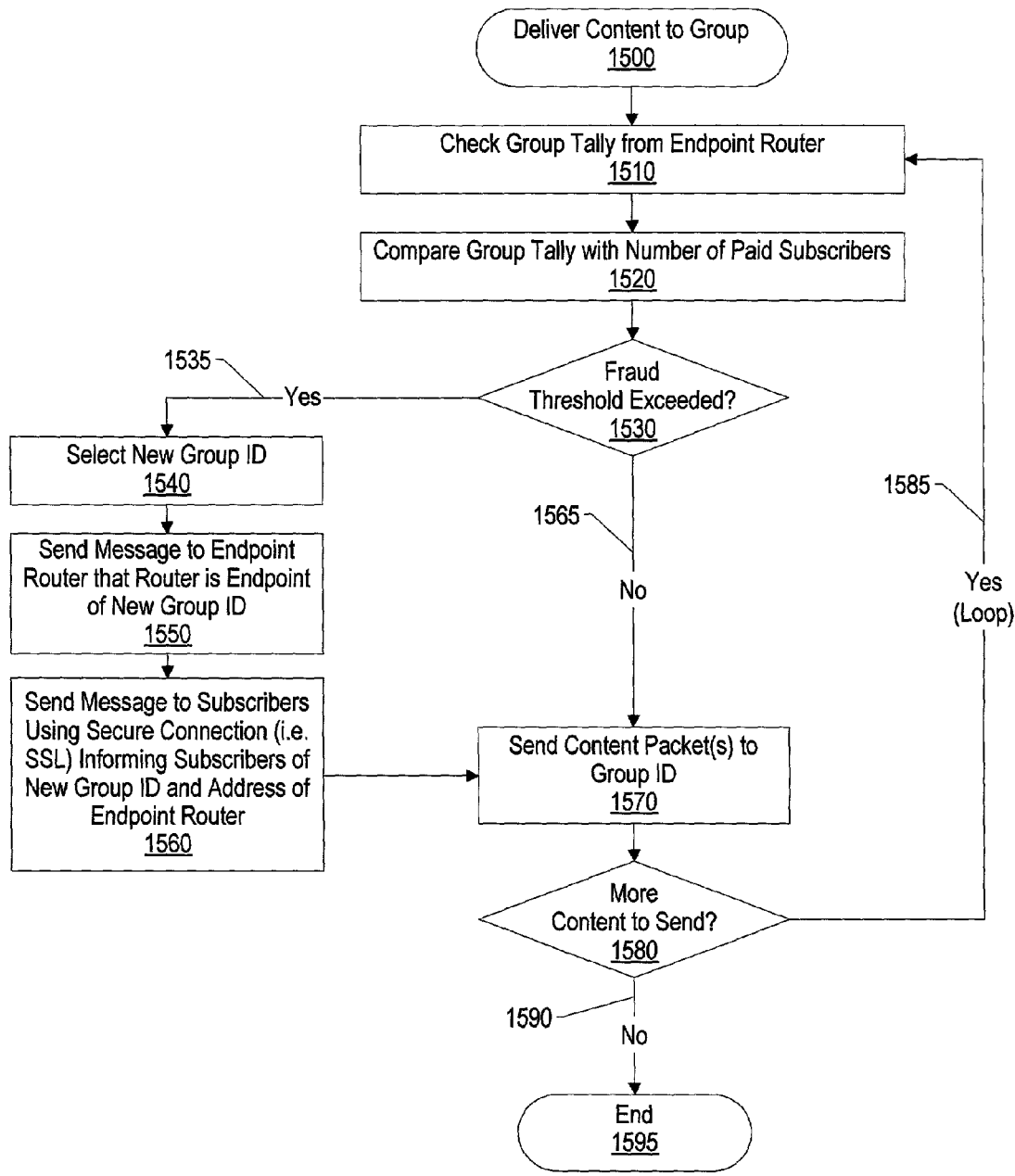
FIG. 15 shows a flowchart for a content producer transmitting multicast content and changing multicast group identifiers periodically based upon detection of fraudulent receivers.

FIG. 15 shows a flowchart for a content producer transmitting multicast content and changing multicast group identifiers periodically based upon detection of fraudulent receivers. Processing commences at 1500 whereupon the group tally for the current multicast group is retrieved from the Designated Router that serves the content producer's subnet, also referred to as the Endpoint Router (step 1510). The retrieved tally is compared with the number of subscribers that were previously processed (step 1520, see FIG. 14 for details regarding subscriber processing).

A determination is made, based on the comparison, if a fraud threshold is exceeded (decision 1530). For example, the content producer might indicate that when the multicast group tally exceeds the subscriber count by two percent (2%), then the multicast group address for the content should be changed.

If the fraud threshold has been exceeded, decision 1530 branches to "yes" branch 1535 whereupon a different multicast group address is selected (step 1540). A request is sent to the Endpoint Router indicating that the Endpoint Router is now the endpoint for the newly selected multicast group (step 1550). In addition, messages are sent to the subscribers using the secure connection informing the client devices that the multicast group address has been changed along with details concerning the new multicast group address (step 1560). In this manner, both the content producer and the subscribers change the multicast group address, but illicit receivers of the content (without access to the secure connection) are not informed of the multicast group change and therefore stop receiving the multicast group content. On the other hand, if the fraud threshold has not been exceeded, decision 1530 branches to "no" branch 1565 bypassing the multicast group changing steps described above.

Multimedia content packets are sent to the current multicast group address (step 1570) using the TTL value corresponding to the subscriber that is furthest down the spanning tree from the content producer. As described above, this address may be the initial address provided by the producer to the subscribers, or may be an updated address. A determination is made as to whether there are more content packets to send to the multicast group (decision 1580). If there are more packets to send, decision 1580 branches to "yes" branch 1585 which loops back to determine whether the multicast group address needs to be changed and send the next packets. This looping continues until there are no more content packets to send, whereupon decision 1580 branches to "no" branch 1590 and processing ends at 1595.

Figure 16:
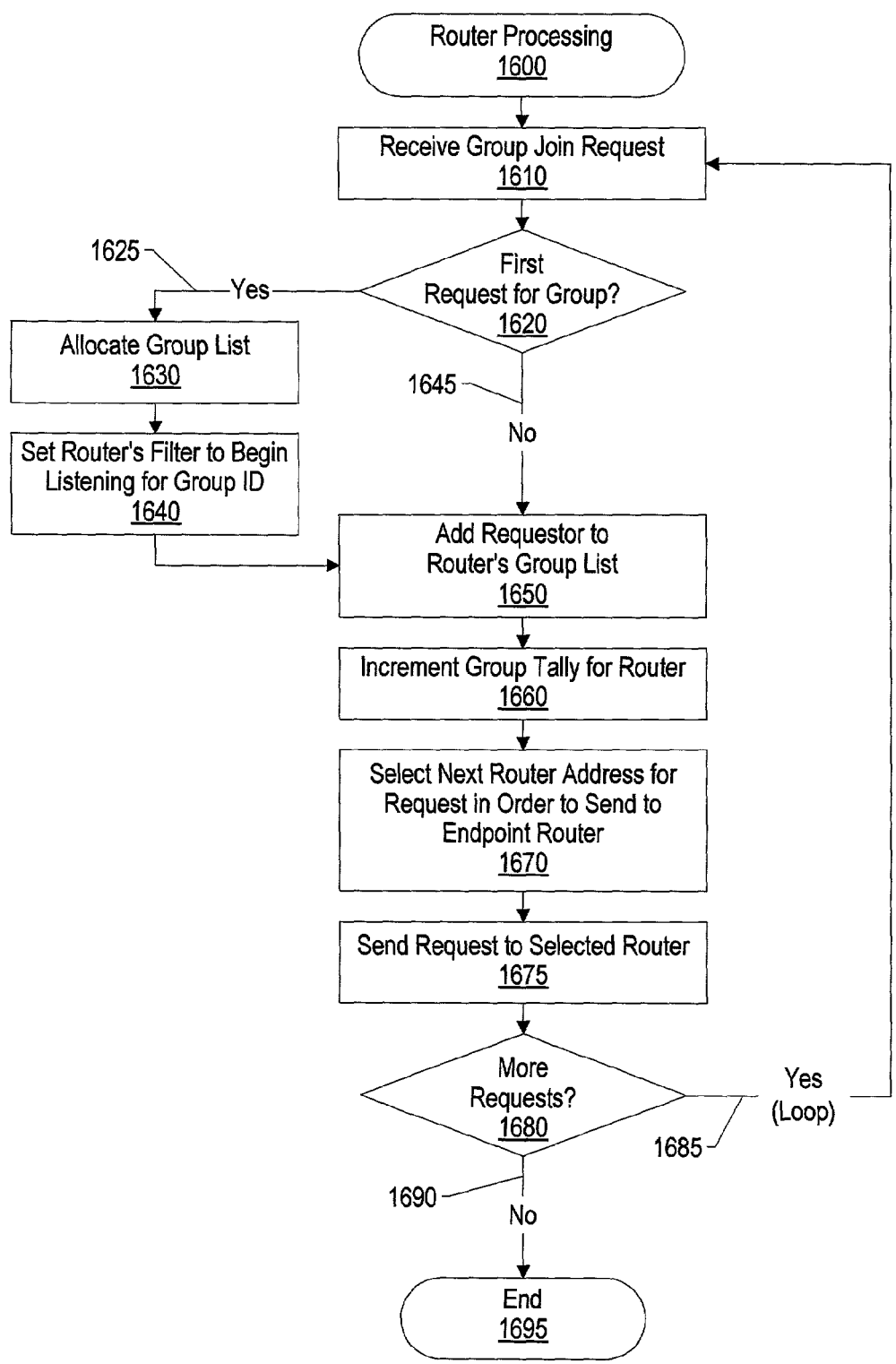
FIG. 16 shows a flowchart for an edge multicast router processing a group join from a receiver and transmitting receiver information upstream to the content producer.

FIG. 16 shows a flowchart for a multicast router processing a group join from a receiver and transmitting receiver information upstream to the content producer. Processing commences at 1600 whereupon the multicast router receives a group join request (step 1610). A determination is made as to whether the join request is the first request at the router corresponding to the multicast group (decision 1620). If it is the first request, decision 1620 branches to "yes" branch 1625 whereupon a multicast group list is allocated for the group (step 1630) and the multicast router's filter is set to begin listening for the multicast group packets (step 1640). On the other hand, if the join request is not the first such request for the multicast group, decision 1620 branches to "no" branch 1645 bypassing steps 1630 and 1640.

In one embodiment, the multicast router keeps track of the devices that make group join requests. In this embodiment, the requestor's IP address is added to the router's group list stored in memory (step 1650). The tally for the number of join requests is incremented (step 1660) to reflect the total number of join requests for the group that have been processed by the router. The router selects next multicast router address that is upstream from the router (step 1670, i.e., the next router closer to the Endpoint Router in the spanning tree).

The group join request is sent to the next router (step 1675). The upstream router(s) also maintain group tallies for the group. Intermediate multicast routers therefore include subtotals of the number of join requests depending upon their position in the spanning tree. Finally, as more fully explained in FIG. 17, the Endpoint Router, which is the Designated Router for the content producer's subnet, also maintains a tally for the group and, because the endpoint router is at the top of the spanning tree in the upstream direction and handles receiver statistics, its tally represents the total number of group join requests that have been received.

A determination is made as to whether more group join requests are received (decision 1680). If there are more requests, decision 1680 branches to "yes" branch 1685 which loops back to process the next request. This looping continues until there are no more join requests, whereupon decision 1680 branches to "no" branch 1690 and processing ends at 1695.

Figure 17:
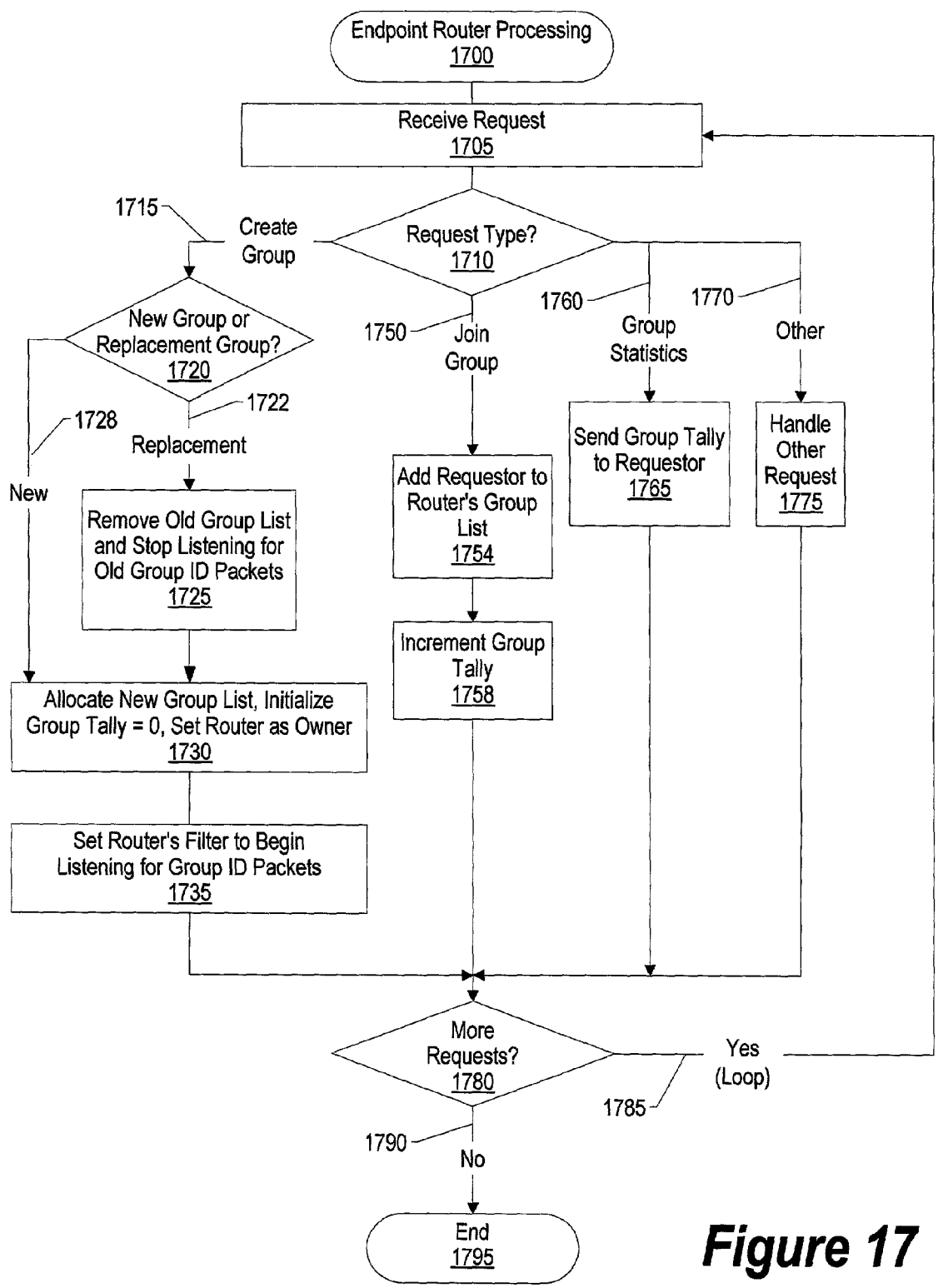
FIG. 17 shows a flowchart for the endpoint multicast router processing requests and providing receiver statistics to the content producer.

FIG. 17 shows a flowchart for the endpoint multicast router processing requests and providing receiver statistics to the content producer. Processing commences at 1700 whereupon the endpoint router (i.e., the Designated Router in the content producer's subnet) receives a request (step 1705). A determination is made as to the type of request that was received (decision 1710).

If the request is a "create group" request received from the content producer, decision 1710 branches to branch 1715 whereupon a decision is made as to whether the creation request is a new group (i.e., an initial multicast group) or an updated group (i.e., an updated multicast address for a multicast group) (decision 1720). If the creation request is for a replacement, or updated, group, decision 1720 branches to branch 1722 whereupon the endpoint router removes the previous group list and removes the previous multicast group address from the router's filter in order to stop listening for the prior group (step 1725). On the other hand, if the create request is for a new multicast group, decision 1720 branches to branch 1728 bypassing step 1725.

A new group list is allocated for the new multicast group, the group tally for the new multicast group is initialized to zero, and the router is set as the owner (i.e., the endpoint router in the spanning tree) for the multicast group (step 1730). The router's filter is set to begin listening for packets corresponding to the new multicast group address (step 1735).

Returning to decision 1710, if the received request is to join a multicast group for which the router is the endpoint router, decision 1710 branches to branch 1750 whereupon, in one embodiment, the requester is added to the router's group list (step 1754). The tally for the multicast group is incremented (step 1758), representing the total number of join requests that have been received for the group on the spanning tree. Indeed, multiple spanning trees can be used for a multicast transmission wherein each of the spanning trees includes an endpoint router that tallies the join requests for their respective trees. In a multiple spanning tree case, the total number of join requests is computed by the content provider adding the group tallies received from the respective endpoint routers.

Again, returning to decision 1710, if the received request is for group statistics, decision 1710 branches to branch 1760 whereupon the endpoint router responds by sending the total group tally to the requester, i.e., the content producer (step 1765). Finally, if the received request is another type of request, decision 1710 branches to branch 1770 whereupon the other type of request is handled (step 1775).

After the request has been handled, a determination is made as to whether there are more requests to handle at the endpoint router (decision 1780). If there are more requests, decision 1780 branches to "yes" branch 1785 which loops back to handle the next request. This looping continues until there are no more requests to handle (i.e., the router is shutdown), at which point decision 1780 branches to "no" branch 1790 and processing ends at 1795.

Figure 18:
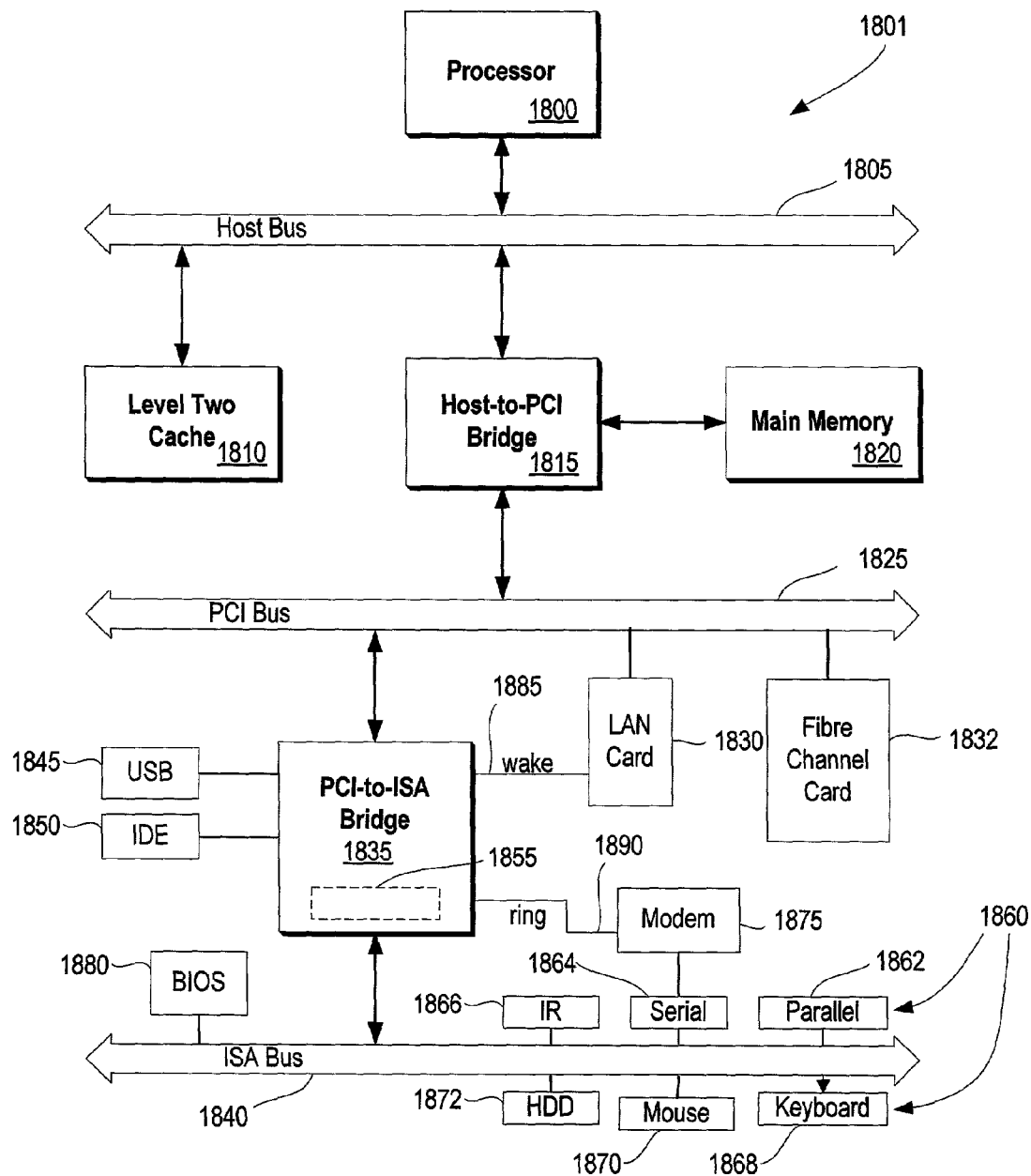
FIG. 18 is a block diagram of an information handling system capable of implementing the present invention.

FIG. 18 illustrates information handling system 1801 which is a simplified example of a computer system capable of performing the operations described herein. Computer system 1801 includes processor 1800 which is coupled to host bus 1805. A level two (L2) cache memory 1810 is also coupled to the host bus 1805. Host-to-PCI bridge 1815 is coupled to main memory 1820, includes cache memory and main memory control functions, and provides bus control to handle transfers among PCI bus 1825, processor 1800, L2 cache 1810, main memory 1820, and host bus 1805. PCI bus 1825 provides an interface for a variety of devices including, for example, LAN card 1830. PCI-to-ISA bridge 1835 provides bus control to handle transfers between PCI bus 1825 and ISA bus 1840, universal serial bus (USB) functionality 1845, IDE device functionality 1850, power management functionality 1855, and can include other functional elements not shown, such as a real-time clock (RTC), DMA control, interrupt support, and system management bus support. Peripheral devices and input/output (I/O) devices can be attached to various interfaces 1860 (e.g., parallel interface 1862, serial interface 1864, infrared (IR) interface 1866, keyboard interface 1868, mouse interface 1870, fixed disk (HDD) 1872 coupled to ISA bus 1840. Alternatively, many I/O devices can be accommodated by a super I/O controller (not shown) attached to ISA bus 1840.

BIOS 1880 is coupled to ISA bus 1840, and incorporates the necessary processor executable code for a variety of low-level system functions and system boot functions. BIOS 1880 can be stored in any computer readable medium, including magnetic storage media, optical storage media, flash memory, random access memory, read only memory, and communications media conveying signals encoding the instructions (e.g., signals from a network). In order to attach computer system 1801 to another computer system to copy files over a network, LAN card 1830 is coupled to PCI bus 1825 and to PCI-to-ISA bridge 1835. Similarly, to connect computer system 1801 to an ISP to connect to the Internet using a telephone line connection, modem 1875 is connected to serial port 1864 and PCI-to-ISA Bridge 1835.

While the computer system described in FIG. 18 is capable of executing the invention described herein, this computer system is simply one example of a computer system. Those skilled in the art will appreciate that many other computer system designs are capable of performing the invention described herein. In addition, other computing technology, such as that using wireless devices and personal digital assistants (PDAs), can be used to implement the invention described herein.

Figure 19:
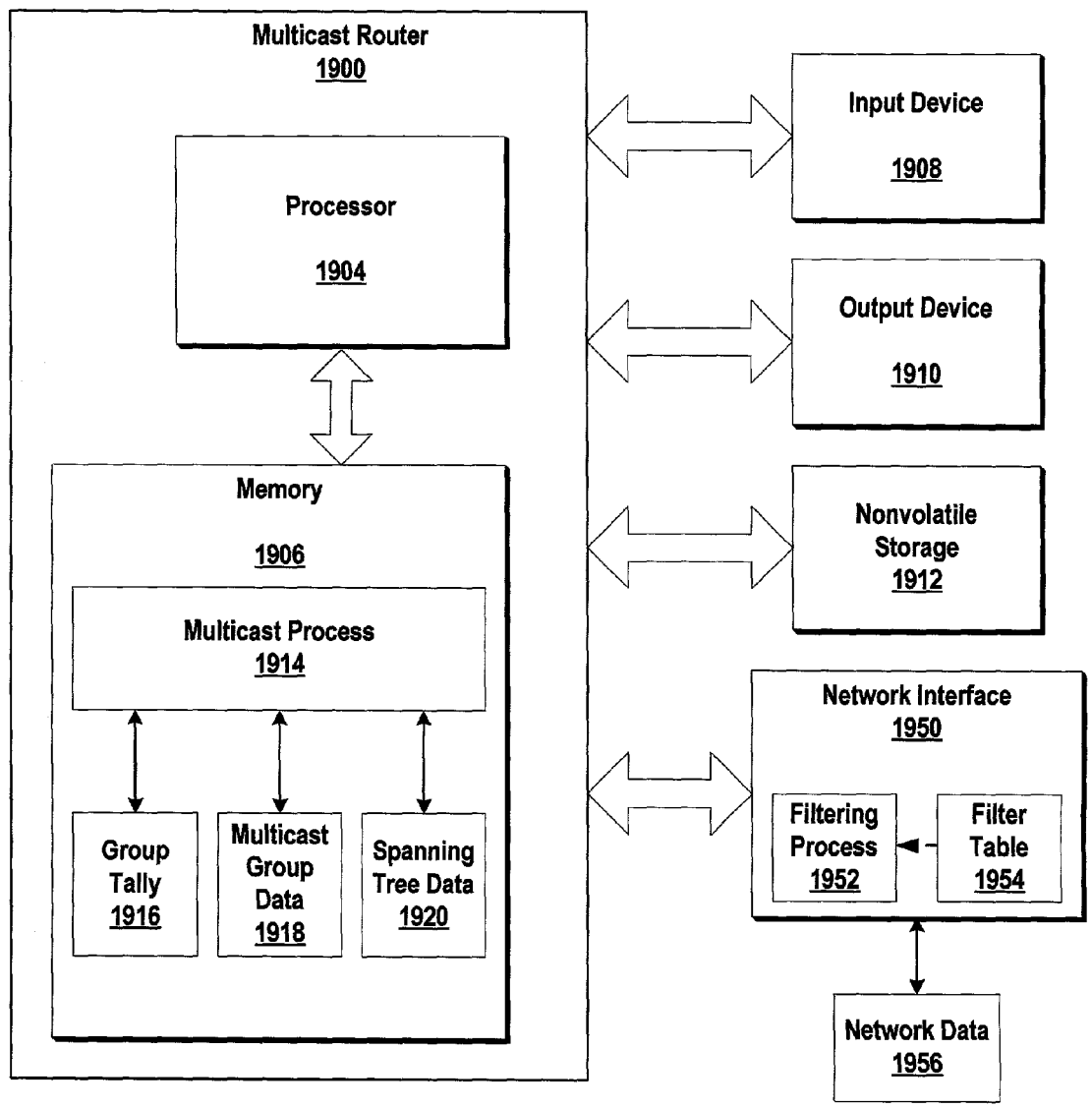
FIG. 19 is a block diagram of a multicast router capable of implementing the present invention.

FIG. 19 illustrates multicast router 1900 which is a simplified example of a router capable of performing the multicast routing operations described herein. Multicast router 1900 is shown include a processor, or processors 1904, and a memory 1906. Multicast process 1914 is shown to be resident in memory 1906 and manages group tally 1916 for the multicast group and multicast group data used to manage the group 1918. In addition, memory 1906 includes spanning tree data 1920 used by multicast router 1900 to communicate to upstream and downstream multicast routers within a spanning tree.

An input device 1908 and an output device 1910 are connected to multicast router 1900 and represent a wide range of varying I/O devices such as disk drives, keyboards, modems, network adapters, printers and displays. Nonvolatile storage device 1912, includes a disk drive, nonvolatile memory, optical drive, or any other nonvolatile storage device, is shown connected to multicast router 1900.

Network interface 1950 is used by multicast router 1900 to communicate to computer systems and other multicast routers through network data 1956. The input side of the network interface includes filtering process 1952 which listens for packets, including the multicast groups to which one or more clients have joined. Filtering process 1952 uses filter table 1954. Filter table 1954 includes data regarding packets for which the multicast router is listening. For example, if a downstream client joins a multicast group, identification information regarding the multicast group are included in filter table 1954. When subsequent packets (i.e., sent from the content producer) pass through multicast router 1900, filtering process 1954 with notice the packets and provide them to the multicast router for appropriate handling (i.e., transmission to downstream multicast routers as determined by the spanning tree).

While the switch described in FIG. 19 is capable of executing the invention described herein, this device is simply one example of a multicast router. Those skilled in the art will appreciate that many other multicast router designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for gathering data regarding multicast group receivers, said method comprising:

identifying a multicast group identifier to which data is sent over a computer network;

receiving, from a device attached to the computer network, receiver data corresponding to one or more receivers, wherein each of the receivers has joined a multicast group corresponding to the multicast group identifier; and performing an action in response to receiving the receiver data, the performing including:

comparing a tally included in the receiver data with a second tally corresponding to a number of subscribers authorized to receive data sent to the multicast group;

identifying an illicit receiver limit;

determining whether the tally exceeds the second tally by the illicit receiver limit; and changing the multicast group identifier to a second multicast group identifier to which the data is sent over the computer network in response to the determining.

2. The method as described in claim 1 wherein the receiver data includes demographic data corresponding to the receivers and wherein the performing further comprises:

identifying group demographic data from the receiver data; and analyzing the group demographic data.

3. The method as described in claim 1 further comprising:

establishing a unicast connection with one or more client devices, wherein the client devices are included in the one or more receivers;

receiving subscription requests from the client devices over the unicast connections;

validating the subscription requests;

sending, over the unicast connections, the multicast group identifier to each client that corresponds to a validated subscription request; and transmitting one or more data packets through the computer network, wherein each of the data packets includes a destination address based on the multicast group identifier.

4. The method as described in claim 3 further comprising:

receiving a time-to-live value from each of the clients over the unicast connections;

identifying the largest time-to-live value received; and including the largest time-to-live value in each of the transmitted data packets.

5. The method as described in claim 1 wherein the device from which data is received is an endpoint router.

6. An information handling system comprising:

one or more processors;

a memory accessible by the processors;

a network interface connecting the information handling system to a computer network; and a multicast receiver gathering tool for gathering data regarding multicast group receivers, the multicast receiver gathering tool including:

means for identifying a multicast group identifier to which data is sent over the computer network;

means for receiving, from a device attached to the computer network, receiver data corresponding to one or more receivers, wherein each of the receivers has joined a multicast group corresponding to the multicast group identifier; and means for performing an action in response to receiving the receiver data, the means for performing including:
means for comparing a tally included in the receiver data with a second tally corresponding to a number of subscribers authorized to receive data sent to the multicast group;
means for identifying an illicit receiver limit;
means for determining whether the tally exceeds the second tally by the illicit receiver limit; and
means for changing the multicast group identifier to a second multicast group identifier to which the data is sent over the computer network in response to the determining.

7. The information handling system as described in claim 6 wherein the receiver data includes demographic data corresponding to the receivers and wherein the means for performing further comprises:
means for identifying group demographic data from the receiver data; and
means for analyzing the group demographic data.

8. The information handling system as described in claim 6 further comprising:
means for establishing a unicast connection with one or more client devices, wherein the client devices are included in the one or more receivers;
means for receiving subscription requests from the client devices over the unicast connections;
means for validating the subscription requests;
means for sending, over the unicast connections, the multicast group identifier to each client that corresponds to a validated subscription request; and
means for transmitting one or more data packets through the computer network, wherein each of the data packets includes a destination address based on the multicast group identifier.

9. The information handling system as described in claim 8 further comprising:
means for receiving a time-to-live value from each of the clients over the unicast connections;
means for identifying the largest time-to-live value received; and
means for including the largest time-to-live value in each of the transmitted data packets.

10. The information handling system as described in claim 6 wherein the device from which data is received is an endpoint router.

11. A computer program product stored in a computer readable media, the computer readable media containing instructions for execution by a computer, which, when executed by the computer, cause the computer to implement a method for gathering data regarding multicast group receivers, said method comprising:
identifying a multicast group identifier to which data is sent over the computer network;
receiving, from a device attached to the computer network, receiver data corresponding to one or more receivers, wherein each of the receivers has joined a multicast group corresponding to the multicast group identifier; and
performing an action in response to receiving the receiver data, the performing including:
comparing a tally included in the receiver data with a second tally corresponding to a number of subscribers authorized to receive data sent to the multicast group;
identifying an illicit receiver limit;
determining whether the tally exceeds the second tally by the illicit receiver limit; and
changing the multicast group identifier to a second multicast group identifier to which the data is sent over the computer network in response to the determining.

12. The computer program product as described in claim 11 wherein the receiver data includes demographic data corresponding to the receivers and wherein the performing further comprises:
identifying group demographic data from the receiver data; and
analyzing the group demographic data.

13. The computer program product as described in claim 11 further comprising:
establishing a unicast connection with one or more client devices, wherein the client devices are included in the one or more receivers;
receiving subscription requests from the client devices over the unicast connections;
validating the subscription requests;
sending, over the unicast connections, the multicast group identifier to each client that corresponds to a validated subscription request; and
transmitting one or more data packets through the computer network, wherein each of the data packets includes a destination address based on the multicast group identifier.

14. The computer program product as described in claim 13 further comprising:
receiving a time-to-live value from each of the clients over the unicast connections;
identifying the largest time-to-live value received; and
including the largest time-to-live value in each of the transmitted data packets.

15. The computer program product as described in claim 11 wherein the device from which data is received is an endpoint router.

16. A method of a router connected to a computer network for processing multicast requests, said method comprising:
receiving a multicast group join request from a requesting device connected to the computer network, wherein the request includes a multicast group identifier;
determining that the multicast group join request is the first join request corresponding to the multicast group identifier received at the router:
setting a router filter to include the multicast group identifier in response to the determination;
identifying one or more data packets addressed to the multicast group identifier and transmitted through the computer network in response to the setting;
forwarding the identified data packets to one or more receivers, wherein the requesting device is included in the group of receivers;
incrementing a tally corresponding to the multicast group identifier;
receiving an inquiry request from a computer system connected to the computer network, the inquiry request including the multicast group identifier; and
sending multicast information corresponding to the multicast group identifier to the computer system in response to the inquiry request, wherein the multicast information includes the tally.

17. The method as described in claim 16 further comprising:
   receiving demographic data from the requesting device, wherein the multicast information includes the demographic data.

18. A router comprising:
   one or more processors;
   a memory accessible by the processors;
   a router filter stored in the memory that identifies one or more addresses for which the router is listening;
   a network interface connecting the information handling system to a computer network; and
   a multicast request tool for processing multicast requests, the multicast request tool including:
      means for receiving, at the network interface, a multicast group join request from a requesting device connected to the computer network, wherein the request includes a multicast group identifier;
      means for determining that the multicast group join request is the first join request corresponding to the multicast group identifier received at the router;
      means for adding the multicast group identifier to the filter in response to the determination;
      means for identifying one or more data packets addressed to the multicast group identifier transmitted to the network interface;
      means for forwarding the identified data packets to one or more receivers, wherein the requesting device is included in the group of receivers;
      means for incrementing a tally corresponding to the multicast group identifier;
      means for receiving an inquiry request from a computer system connected to the computer network, the inquiry request including the multicast group identifier; and
      means for sending, through the network interface, multicast information corresponding to the multicast group identifier to the computer system in response to the request, wherein the multicast information includes the tally.

19. The router as described in claim 18 further comprising:
   means for receiving demographic data from the requesting device, wherein the multicast information includes the demographic data.

20. A computer program product stored in a computer readable medium, the computer readable medium containing instructions for execution by a router, which, when executed by the router, cause the router to implement a method for processing multicast requests, said method comprising:
   receiving a multicast group join request from a requesting device connected to a computer network, wherein the request includes a multicast group identifier;
   determining that the multicast group join request is the first join request corresponding to the multicast group identifier received at the router;
   setting a router filter to include the multicast group identifier in response to the determination;
   identifying one or more data packets addressed to the multicast group identifier and transmitted through the computer network in response to the setting;
   forwarding the identified data packets to one or more receivers, wherein the requesting device is included in the group of receivers;
   incrementing a tally corresponding to the multicast group identifier;
   receiving an inquiry request from a computer system connected to the computer network, the inquiry request including the multicast group identifier; and
   sending multicast information corresponding to the multicast group identifier to the computer system, wherein the multicast information includes the tally.

21. The computer program product as described in claim 20 further comprising:
   receiving demographic data from the requesting device, wherein the multicast information includes the demographic data.

* * * * *